US008558401B2

(12) United States Patent
Girardin

(10) Patent No.: US 8,558,401 B2
(45) Date of Patent: Oct. 15, 2013

(54) SYSTEM AND METHOD FOR CONTROLLING A WIND TURBINE

(75) Inventor: Hugues Girardin, Kingsey Falls (CA)

(73) Assignee: Boralex, Inc., Montreal (CA)

( * ) Notice: Subject to any disclaimer, the term of this patent is extended or adjusted under 35 U.S.C. 154(b) by 614 days.

(21) Appl. No.: 12/446,306

(22) PCT Filed: Oct. 18, 2007

(86) PCT No.: PCT/CA2007/001842
§ 371 (c)(1),
(2), (4) Date: Dec. 9, 2010

(87) PCT Pub. No.: WO2008/046215
PCT Pub. Date: Apr. 24, 2008

(65) Prior Publication Data
US 2011/0089692 A1    Apr. 21, 2011

(30) Foreign Application Priority Data

Oct. 18, 2006  (CA) .................................. 2564494

(51) Int. Cl.
*F03D 7/04*  (2006.01)
(52) U.S. Cl.
USPC .............................................. 290/44; 416/39
(58) Field of Classification Search
USPC .................... 290/44, 55; 416/39, 61
See application file for complete search history.

(56) References Cited

U.S. PATENT DOCUMENTS

| 7,086,834 B2* | 8/2006 | LeMieux | 416/1 |
| 7,637,715 B2* | 12/2009 | Battisti | 415/115 |
| 7,708,524 B2* | 5/2010 | Sundermann et al. | 416/39 |
| 8,050,887 B2* | 11/2011 | Ahmann | 702/142 |
| 8,200,451 B2* | 6/2012 | Battisti | 702/136 |
| 8,388,315 B2* | 3/2013 | Haans et al. | 416/1 |
| 2005/0276696 A1* | 12/2005 | LeMieux | 416/61 |
| 2010/0001526 A1* | 1/2010 | Fukuda et al. | 290/44 |
| 2011/0280723 A1* | 11/2011 | Libergren | 416/1 |

* cited by examiner

*Primary Examiner* — Nicholas Ponomarenko
(74) *Attorney, Agent, or Firm* — Baker & Hostetler LLP

(57) ABSTRACT

A system to control a wind turbine, including meteorological instruments for measuring ambient climatic conditions, and generating corresponding meteorological signals, a memory for storing an icing tolerance, a first calculator for calculating an overall icing probability based on the meteorological signals and a controller for stopping the wind turbine when the overall probability of icing is greater than the icing tolerance. Also disclosed is a method for controlling a wind turbine, including the steps of a) measuring ambient climatic conditions and generating corresponding meteorological signals; b) storing in memory an icing tolerance; c) calculating an overall probability of icing based on the meteorological signals; and d) stopping the wind turbine when the overall probability of icing is greater than the icing tolerance.

14 Claims, 48 Drawing Sheets

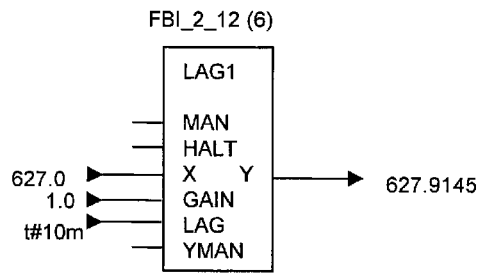
Fig. 12A
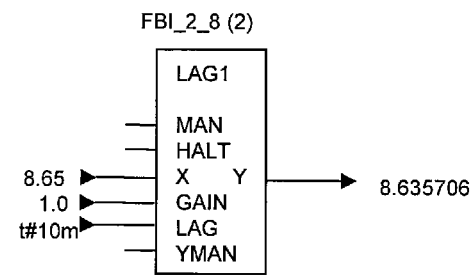
Fig. 12B
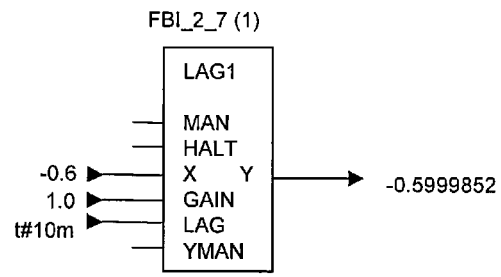
Fig. 12C
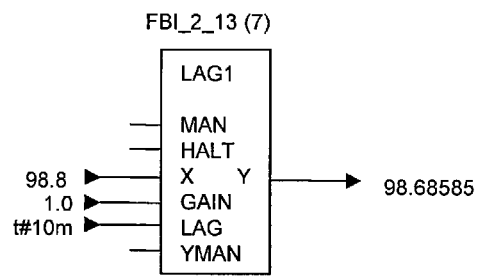
Fig. 12E
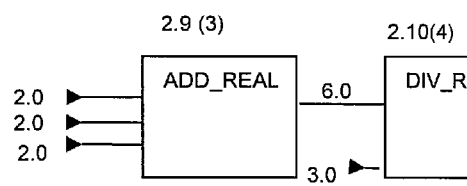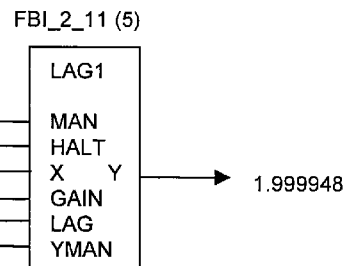
Fig. 12D

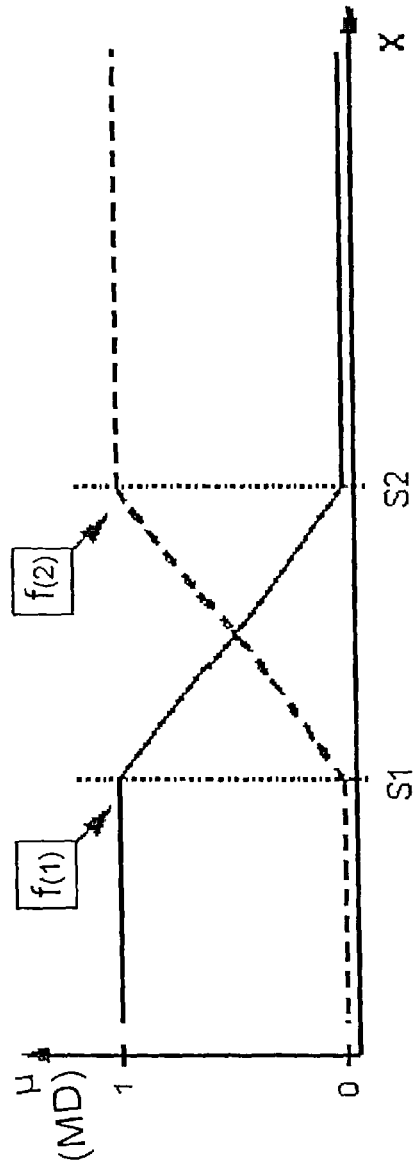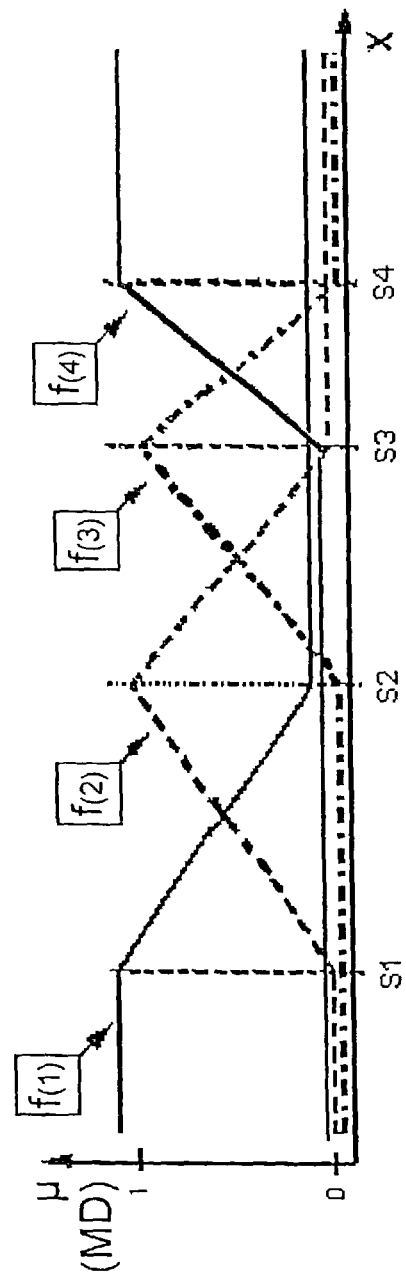

US 8,558,401 B2

SYSTEM AND METHOD FOR CONTROLLING A WIND TURBINE

CROSS-REFERENCE TO RELATED APPLICATIONS

This application is a National Stage of International Patent Application PCT/CA2007/001842, filed on Oct. 18, 2007, which claims priority to foreign Patent Application CA 2,564, 494, filed on Oct. 18, 2006, the disclosures of which are incorporated herein by reference in their entirety.

FIELD OF THE INVENTION

The present invention relates to a system and method for controlling a wind turbine. More particularly, the present invention relates to a system for controlling a wind turbine with an ice detection system during turbine blade icing conditions, as well as a method for controlling the wind turbine during such conditions.

BACKGROUND OF THE INVENTION

Systems used today for detecting ice on wind turbine blades attempt to determine the presence of ice through different methods and transmit a detection signal to the wind turbine control system which stops the turbine at the same moment. Experience has shown that the efficiency of such systems is greatly variable and that the emitted stop signal can be issued late after the start of an icing event and, in some cases, not at all. Consequently, there is already a non-negligible accumulation of ice on the blades at the moment the wind turbine is stopped and therefore there is a risk of breaking-up and projection of ice at speeds that are sufficient enough to cause injuries or material damages, while requiring that a longer natural de-icing cycle be completed before reactivating the wind turbine. In several cases, this results in several days of waiting for favourable climate conditions that promote melting of the ice.

There is thus a need for a more reliable system and method that has the capability of anticipating the formation of ice on wind turbine blades in order to cancel completely the risks of ice projection.

SUMMARY OF THE INVENTION

One object of the present invention is to provide a system and method that addresses at least one of the above-mentioned needs.

More particularly, the present invention provides a system for controlling a wind turbine, comprising:
- meteorological instruments for measuring ambient climate conditions, and generating meteorological signals related thereto;
- a memory for keeping in memory an icing tolerance;
- a first calculator for calculating an overall probability of icing based on the meteorological signals; and
- a controller for stopping the wind turbine when the overall icing probability is greater than the icing tolerance.

The invention also provides a method for controlling a wind turbine, comprising the steps of:
a) measuring ambient climate conditions, and generating meteorological signals related thereto;
b) storing in a memory an icing tolerance;
c) calculating an overall icing probability based on the meteorological signals; and
d) stopping the wind turbine when the overall icing probability is greater than the icing tolerance.

A non-restrictive description of preferred embodiments of the invention will now be given with reference to the appended drawings.

BRIEF DESCRIPTION OF DRAWINGS

FIGS. 12A to 12E represent a detailed block diagram of the CALCULATE_AVERAGES process of the wind turbine control system in FIG. 1, showing a second example with numerical data.

FIGS. 25A and 25B are graphs illustrating cycle diagrams of the functional block FUZ_ATERM_REAL with two membership functions and four membership functions respectively.

DETAILED DESCRIPTION OF A PREFERRED EMBODIMENT OF THE INVENTION

An objective of the invention is met with a system and a method that reads, stores and filters continuously climatic conditions in order to determine those that are favourable towards the accumulation of ice on wind turbine blades while being linked to the wind turbine control system in order to also measure continuously its level of efficiency and to issue eventually a stop command thereto.

Figure 1:
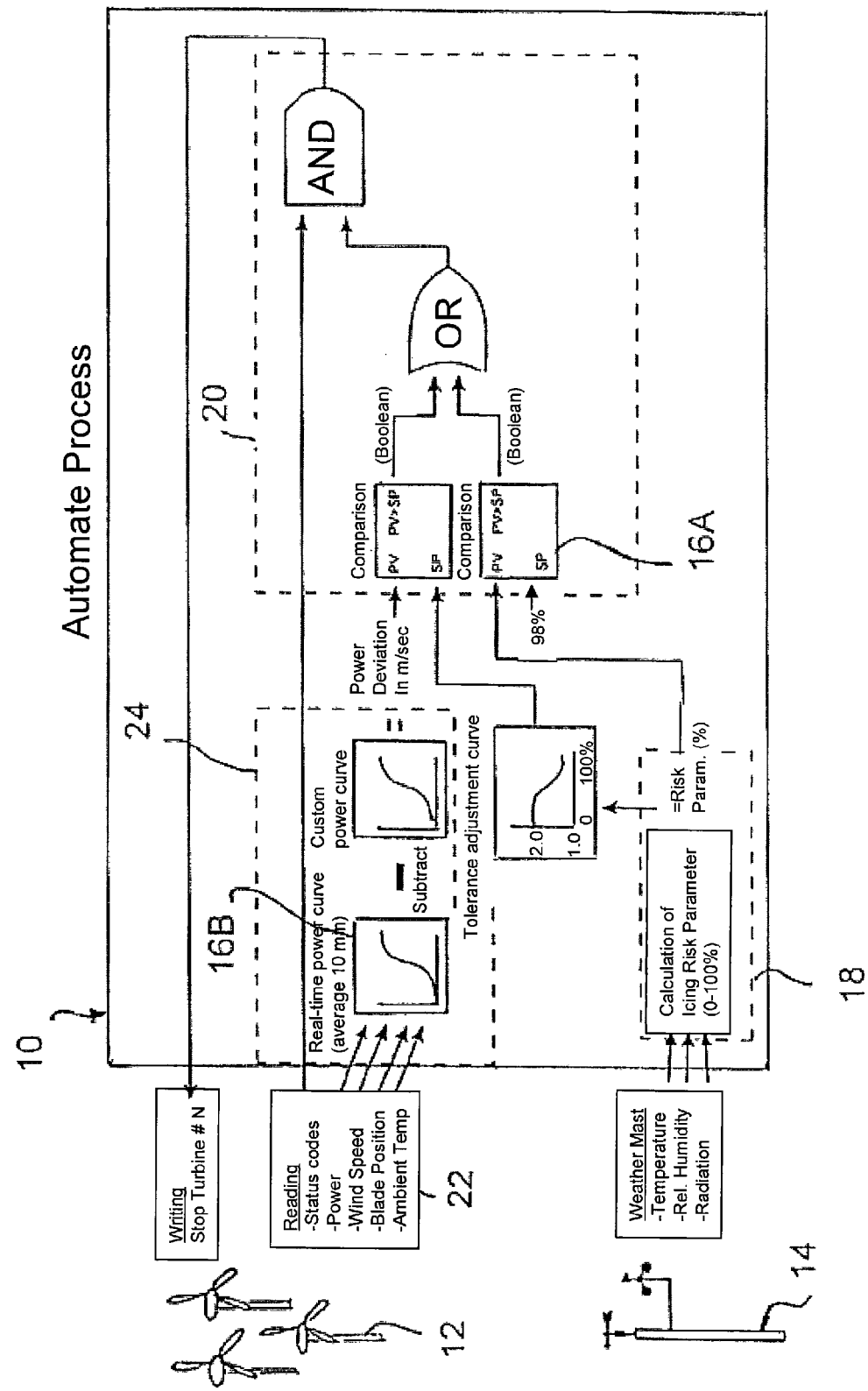
FIG. 1 is a block schematic view of the functioning of the system, according to a preferred embodiment of the invention.
Figure 2A:
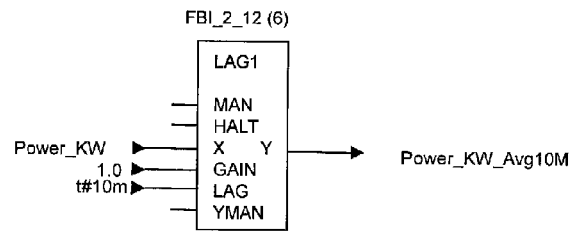
FIGS. 2A to 2E represent a detailed schematic block diagram of the CALCULATE_AVERAGES process of the wind turbine control system in FIG. 1.
Figure 2B:
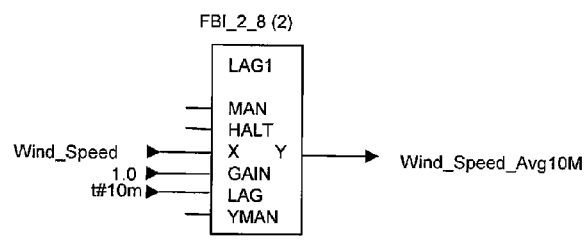
Figure 2C:
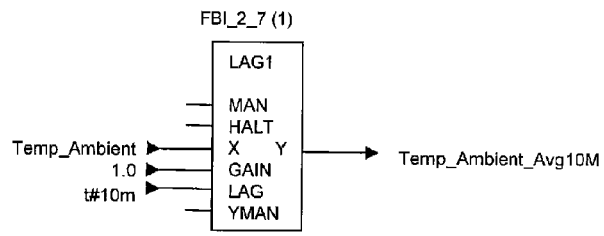
Figure 2E:
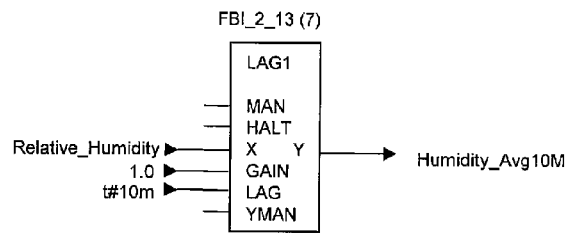
Figure 2D:
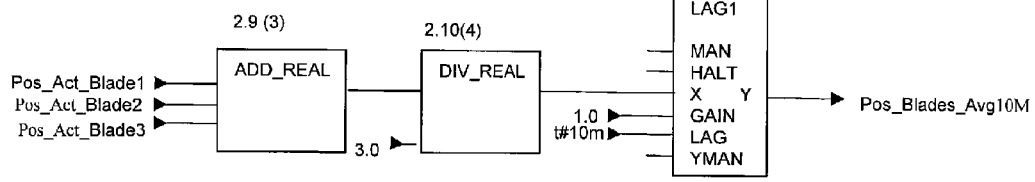
Figure 3A:
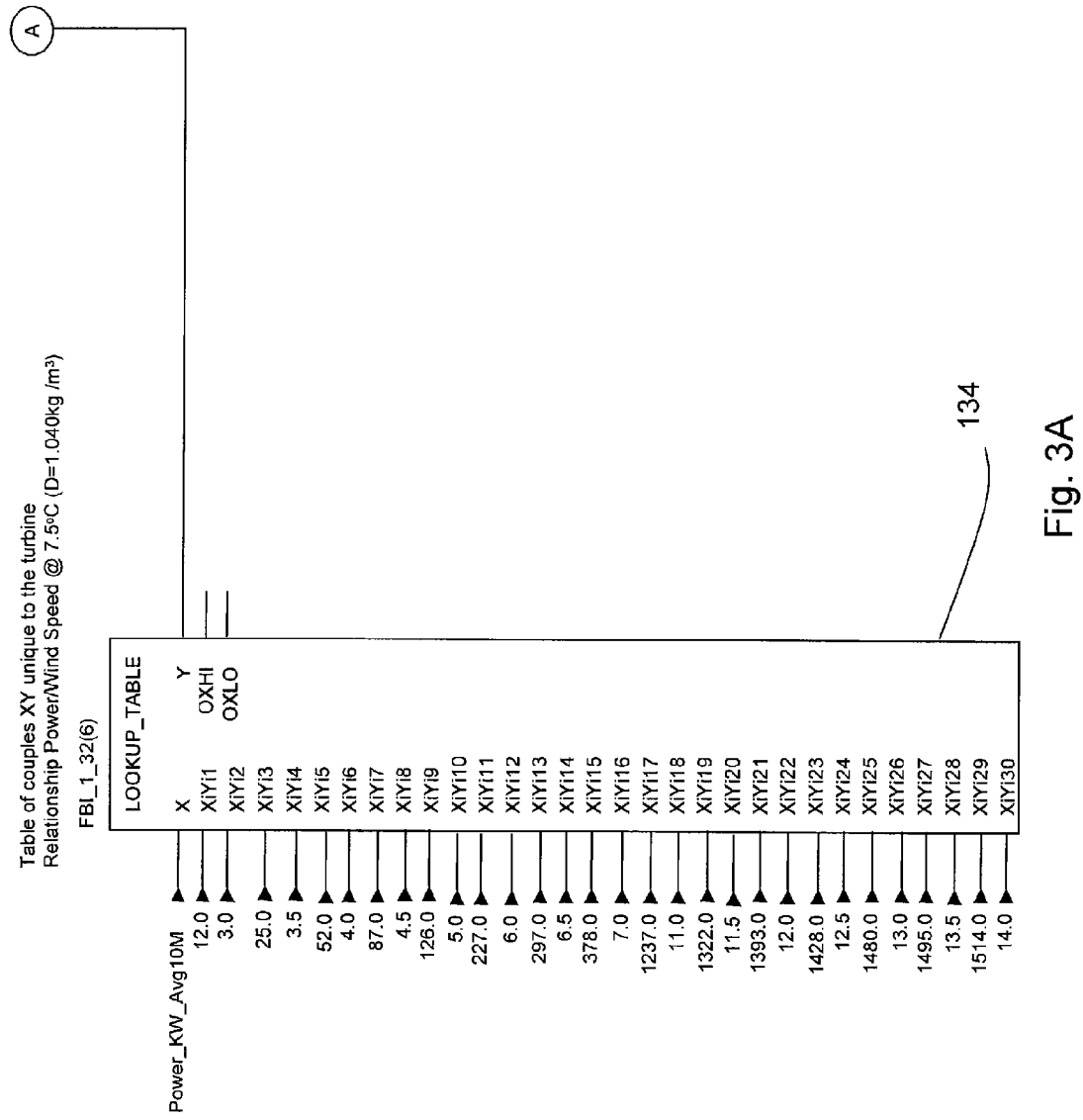
FIGS. 3A to 3D represent a detailed schematic block diagram of the MEASURE_EFFICIENCY process of the wind turbine control system in FIG. 1.
Figure 3B:
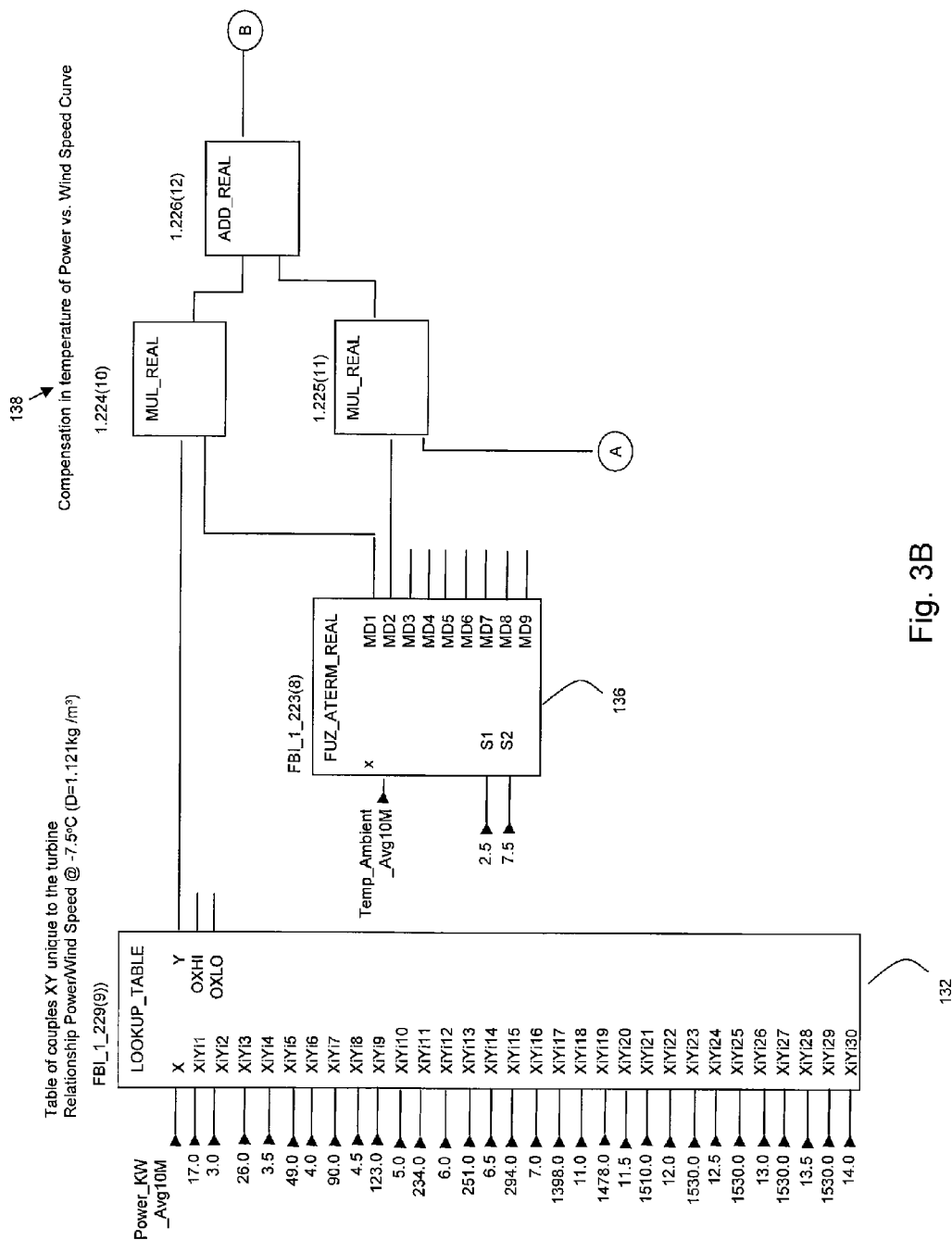
Figure 3C:
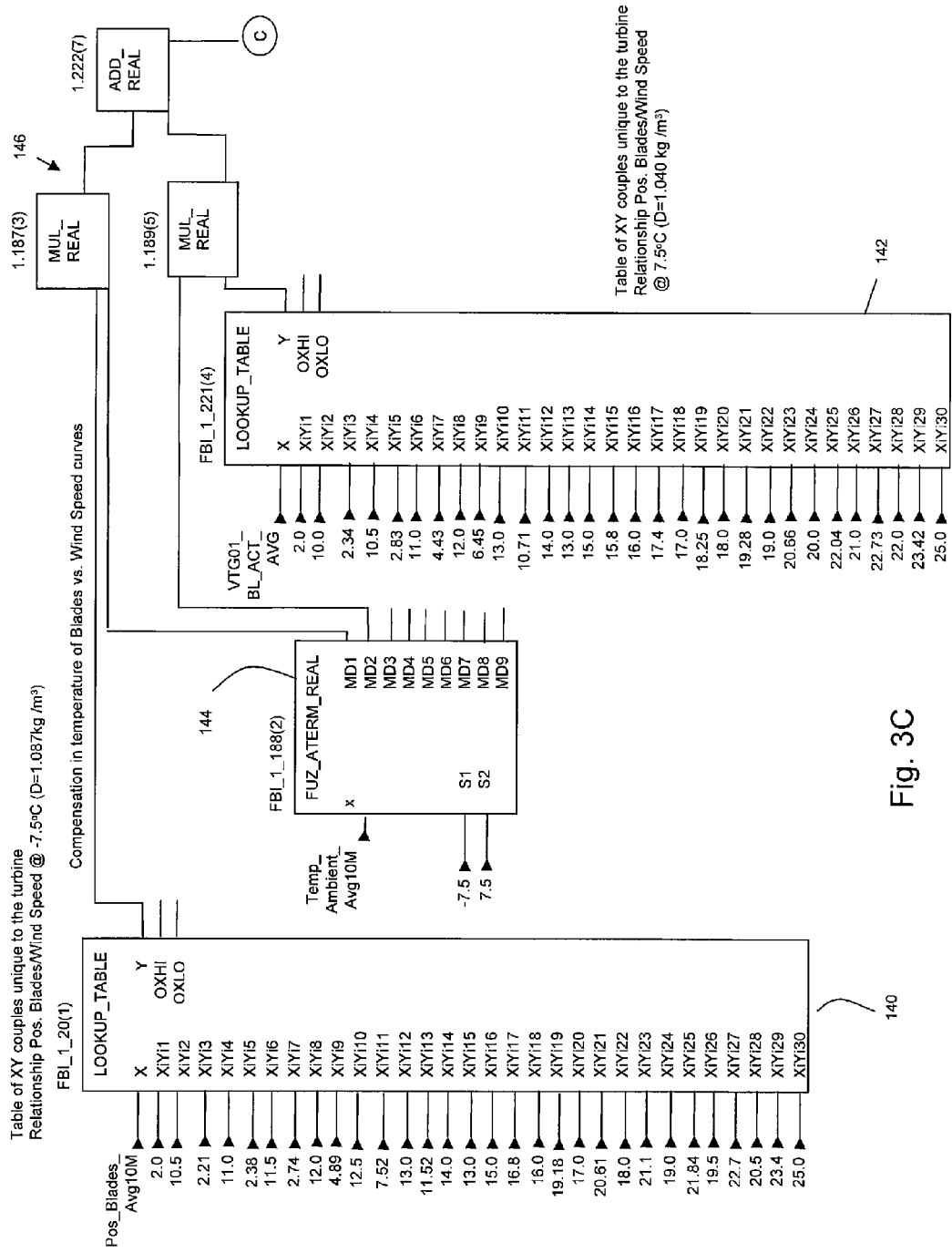
Figure 3D:
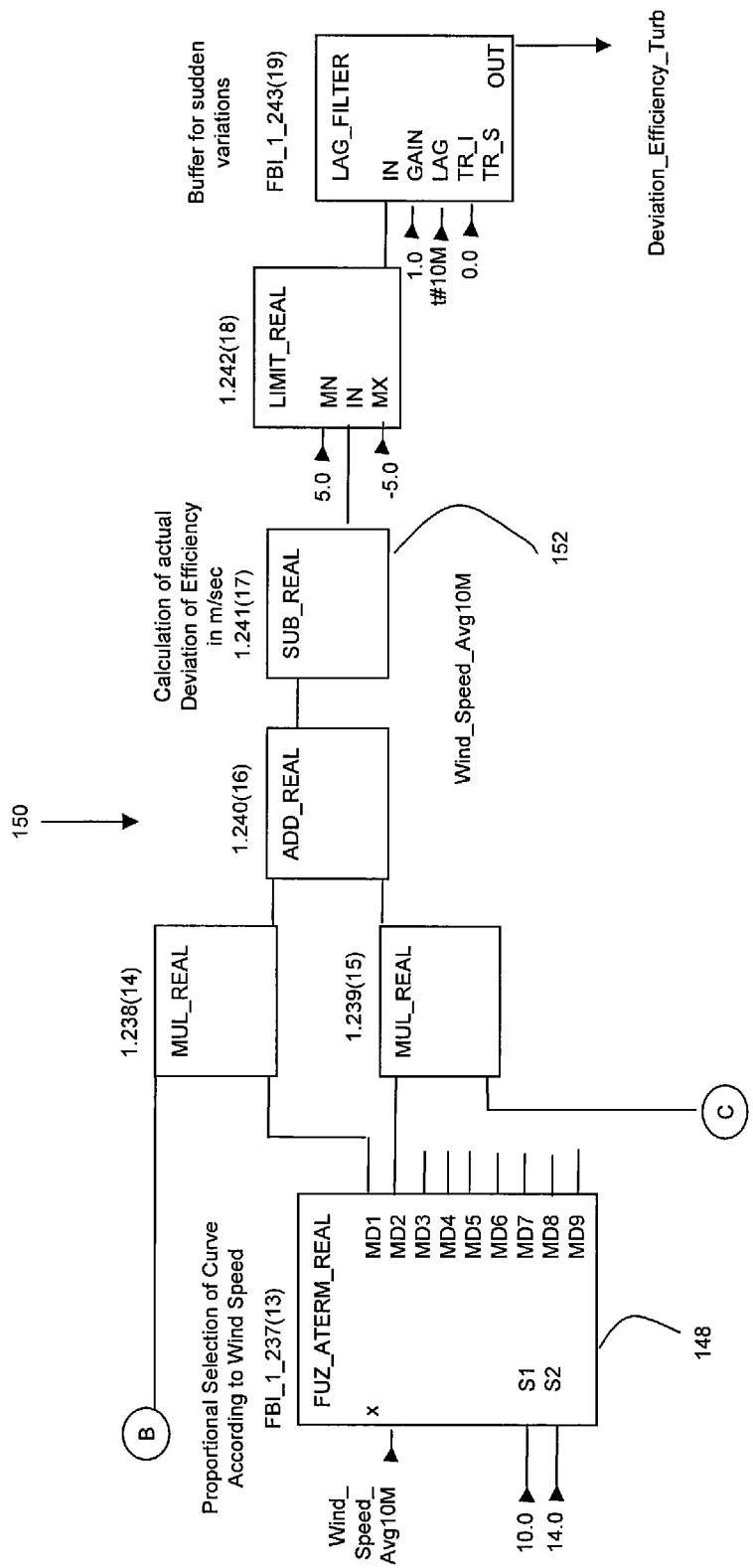
Figure 4A:
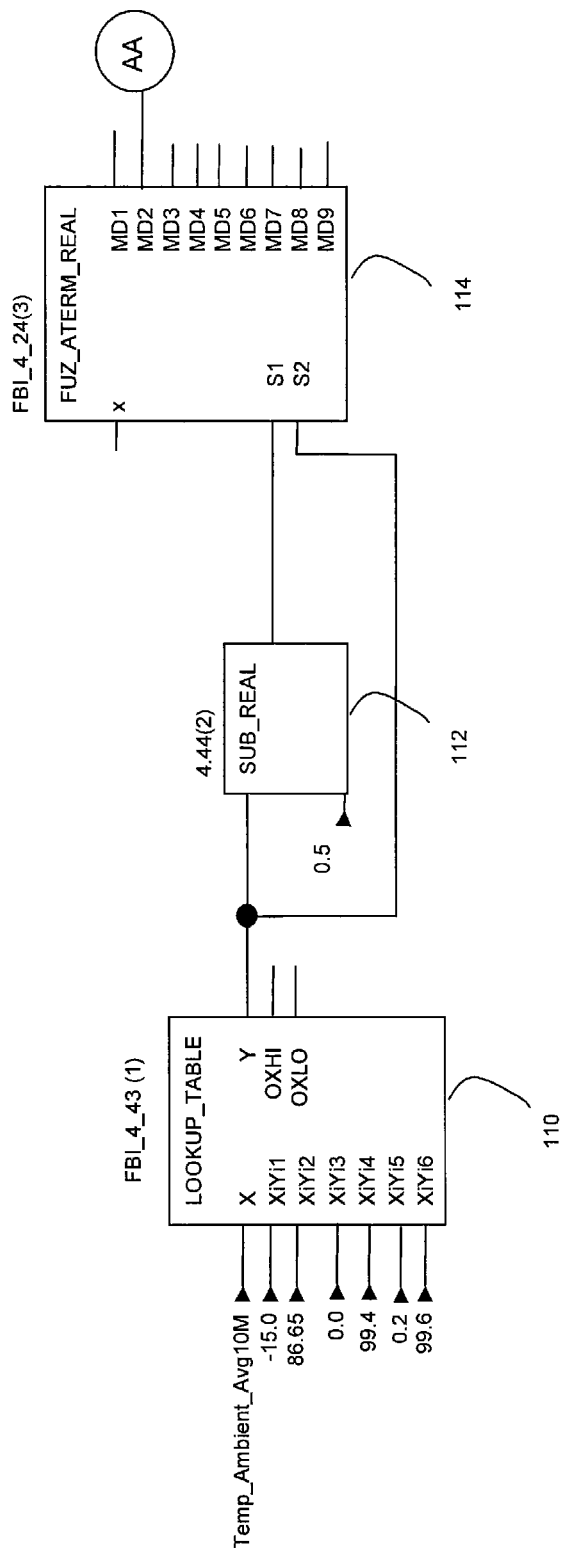
FIGS. 4A to 4D represent a detailed block diagram of the CALCULATE_PROB_ICE process of the wind turbine control system in FIG. 1.
Figure 4B:
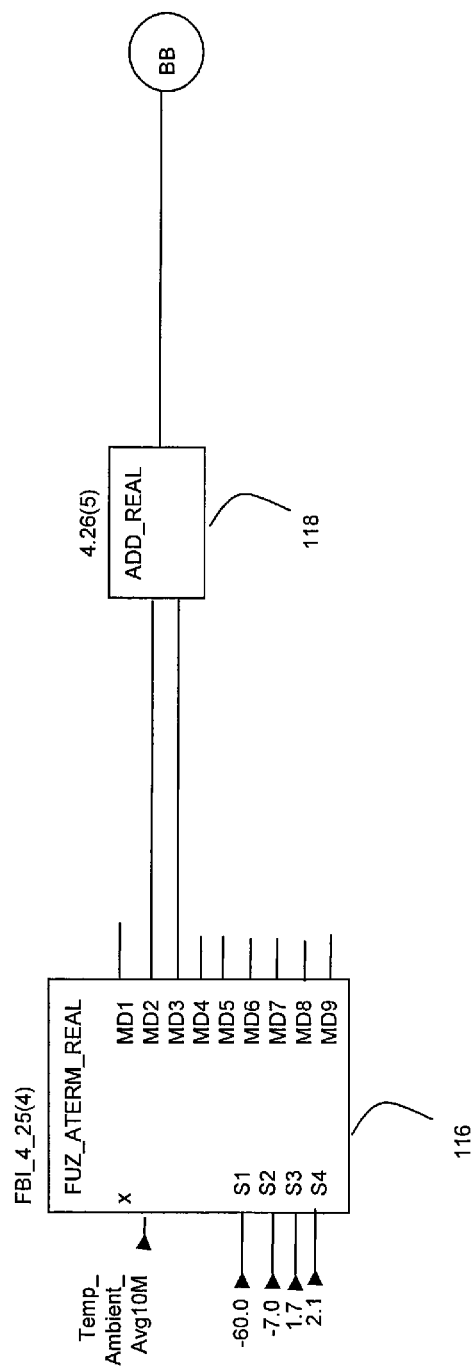
Figure 4C:
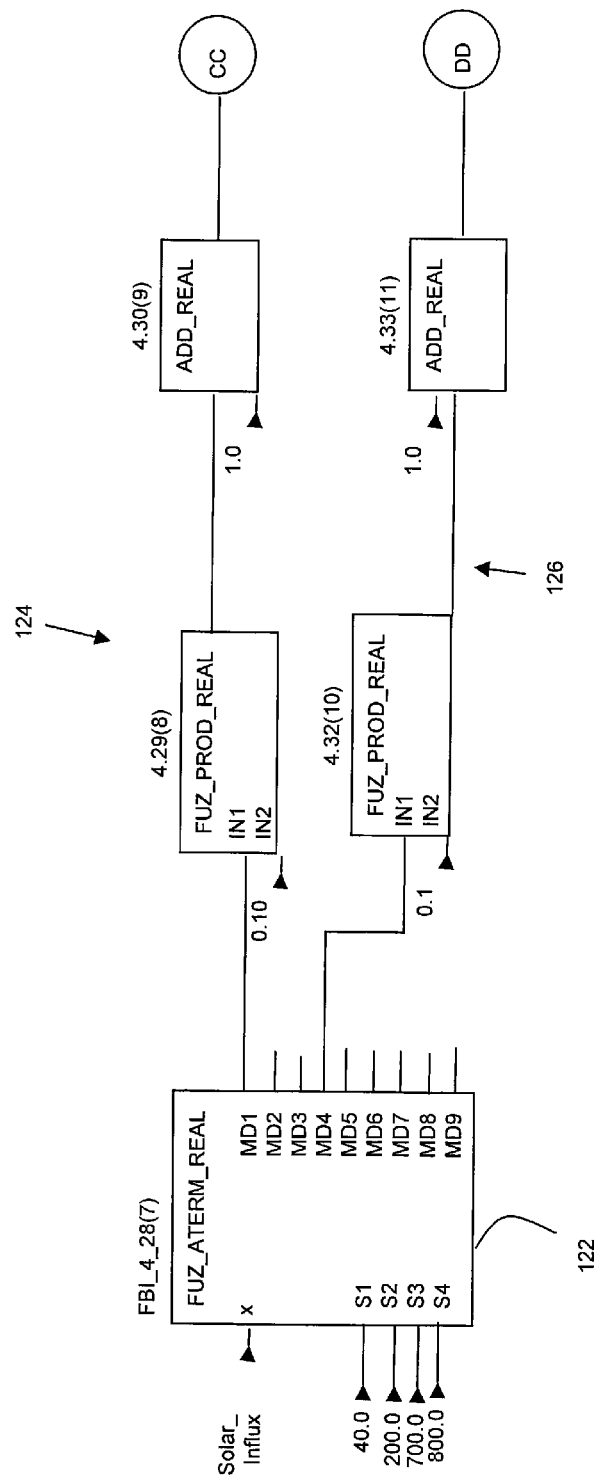
Figure 4D:
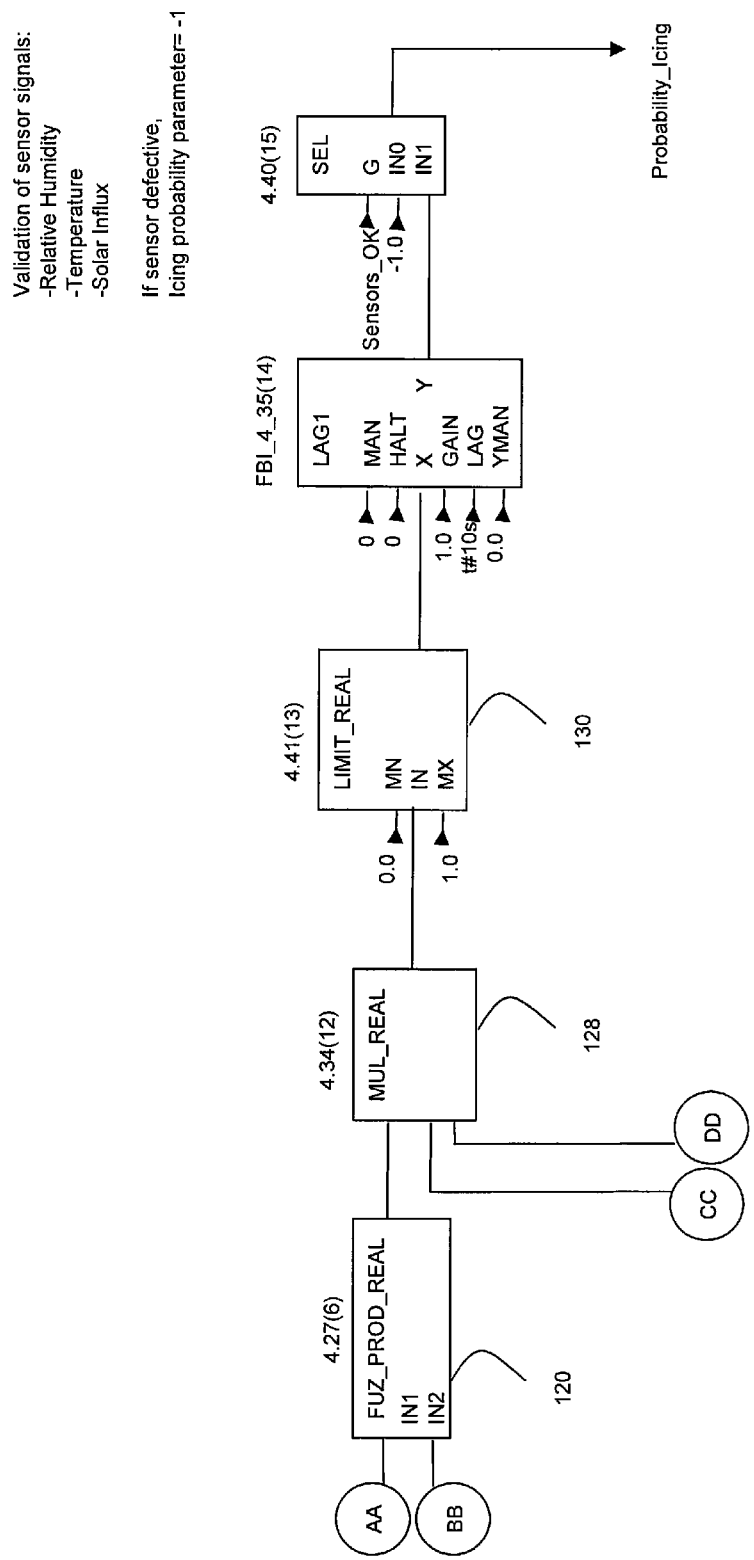

The objective of detecting ice and controlling the wind turbine is met with a system 10, as shown in FIG. 1. The system 10 for controlling a wind turbine 12 comprises meteorological instruments 14 for measuring ambient climatic conditions and generating meteorological signals based thereon, a memory 16A for storing an icing tolerance, a first calculator 18 for calculating an overall icing probability from the meteorological signals and a controller 20 for stopping the wind turbine 12 when the overall icing probability is greater than the icing tolerance.

As shown in FIG. 1, preferably the memory 16B stores reference efficiency curves and an efficiency deviation tolerance, and the system further comprises sensors 22 for detecting an average power generated by the wind turbine, an average position of the wind turbine blades, and an average wind speed proximate the wind turbine, and for generating efficiency signals based thereon. The system 10 also comprises a second calculator 24 for calculating the actual efficiency of the wind turbine based on the efficiency signals. The controller 20 stops the wind turbine when a deviation between the actual efficiency and an average efficiency calculated based upon the reference efficiency curves is greater than an efficiency deviation tolerance.

Preferably, the climatic conditions comprise an average ambient temperature proximate the wind turbine, an average ambient relative humidity proximate the wind turbine, and an average ambient solar influx proximate the wind turbine. Moreover, as illustrated in FIGS. 4A to 4D, the first calculator 18 preferably comprises:

first means 110 for calculating a first relative humidity variable associated with the average ambient temperature, said first variable being obtained through interpolation of a first characteristic curve of characteristic variables of relative humidity as a function of a characteristic ambient temperature;

second means 112 for calculating a second relative humidity variable resulting from the subtraction of a lower limit value from the first variable;

third means 114 for calculating a first partial probability of icing corresponding to a first degree of approach between 0.0 and 1.0 of the ambient average humidity towards the first variable according to a fuzzification operation to obtain membership degrees of the ambient average humidity to the first variable and second variable;

fourth means 116 for calculating a second degree of approach and a third degree of approach between 0.0 and 1.0 of the average ambient temperature towards a lower limit temperature and an upper limit temperature respectively according to a fuzzification operation to obtain membership degrees of the ambient average temperature to a series of temperatures comprising the lower limit temperature, the upper limit temperature, at least one additional temperature lower than the lower limit temperature and at least one additional temperature above the upper limit temperature;

fifth means 118 for calculating a second partial probability of icing by adding the second degree of approach and the third degree of approach;

sixth means 120 for calculating a third partial probability of icing by multiplying the first partial probability of icing and the second partial probability of icing;

seventh means 122 for calculating a fourth degree of approach and a fifth degree of approach between 0.0 and 1.0 of the average ambient solar influx towards a lower limit solar influx and an upper limit solar influx respectively according to a fuzzification operation to obtain membership degrees of the average ambient solar influx to a series of values of solar influx comprising the lower limit solar influx and the upper limit solar influx and at least two other values of solar influx between the lower limit solar influx and the upper limit solar influx;

eighth means 124 for calculating a upward adjustment parameter based on solar influx according to the formula:

upward adjustment parameter=((fourth degree of approach)×0.1)+1.0;

ninth means 126 for calculating a downward adjustment parameter based on solar influx according to the formula:

downward adjustment parameter=1.0−((fifth degree of approach)×0.1);

tenth means 128 for calculating an amplified probability of icing by multiplying the third partial probability of icing by the upward adjustment parameter and the downward adjustment parameter; and eleventh means 130 for calculating the overall probability of icing which is equal to the amplified probability of icing if the amplified probability of icing is equal or lower than 1.0 and the probability of overall icing is equal to 1.0 if the amplified probability of icing is greater than 1.0.

As illustrated in FIGS. 3A to 3D, preferably, the second calculator 24 comprises:

twelfth means 132 for calculating a first theoretical wind speed associated with the average power generated by the wind turbine, said first theoretical wind speed being obtained through interpolation of a second generated power characteristic curve as a function of wind speed at a lowest temperature measured proximate the wind turbine;

thirteenth means 134 for calculating a second theoretical wind speed associated with the average power generated by the wind turbine, said second theoretical wind speed being obtained through interpolation of a third generated power characteristic curve as a function of wind speed at a highest temperature measured proximate the wind turbine;

fourteenth means 136 for calculating a sixth degree of approach and a seventh degree of approach between 0.0 and 1.0 of the average ambient temperature towards a first critical temperature and a second critical temperature respectively according to a fuzzification operation to obtain membership degrees of the ambient average temperature to a first critical temperature and a second critical temperature;

fifteenth means 138 for calculating a first intermediate theoretical wind speed by multiplying the sixth degree of approach by the first theoretical wind speed, a second intermediate theoretical wind speed by multiplying the seventh degree of approach by the second theoretical wind speed, and a third intermediate theoretical wind speed by adding the first intermediate theoretical wind speed and the second intermediate theoretical wind speed;

sixteenth means 140 for calculating a third theoretical wind speed associated with an average position of the wind turbine blades, said third theoretical wind speed being obtained through interpolation of a third characteristic curve of the position of the blades as a function of the wind speed at the lowest temperature measured proximate the wind turbine;

seventeenth means 142 for calculating a fourth theoretical wind speed associated with the average position of the wind turbine blades, said fourth theoretical wind speed being obtained through interpolation of a fourth characteristic curve of the position of the blades as a function of the wind speed at the highest temperature measured proximate the wind turbine;

eighteenth means 144 for calculating an eighth degree of approach and a ninth degree of approach between 0.0 and 1.0 of the average ambient temperature towards a third critical temperature and a fourth critical temperature respectively according to a fuzzification operation to obtain membership degrees of the average ambient temperature towards the third critical temperature and the fourth critical temperature;

nineteenth means 146 for calculating a fourth intermediate theoretical wind speed by multiplying the eighth degree of approach by the third theoretical wind speed, a fifth intermediate theoretical wind speed by multiplying the ninth degree of approach by the fourth theoretical wind speed, and a sixth intermediate theoretical wind speed by adding the fourth intermediate theoretical wind speed and the fifth intermediate theoretical wind speed;

twentieth means 148 for calculating a tenth degree of approach and an eleventh degree of approach between 0.0 and 1.0 of the average wind speed proximate the wind turbine towards a first critical wind speed and a second critical wind speed respectively according to a fuzzification operation in order to obtain membership degrees of the average wind speed towards a first critical wind speed and a second critical wind speed;

twenty-first means 150 for calculating a seventh intermediate theoretical wind speed by multiplying the tenth degree of approach by a third intermediate theoretical wind speed, an eighth intermediate theoretical wind speed by multiplying the eleventh degree of approach by the sixth intermediate theoretical wind speed, and a ninth intermediate theoretical wind speed by adding the seventh intermediate theoretical wind speed and the eighth intermediate theoretical wind speed; and twenty-second means 152 for calculating the deviation between the actual efficiency and the average efficiency by subtracting the average wind speed proximate the wind turbine from the ninth intermediate wind speed.

Figure 6:
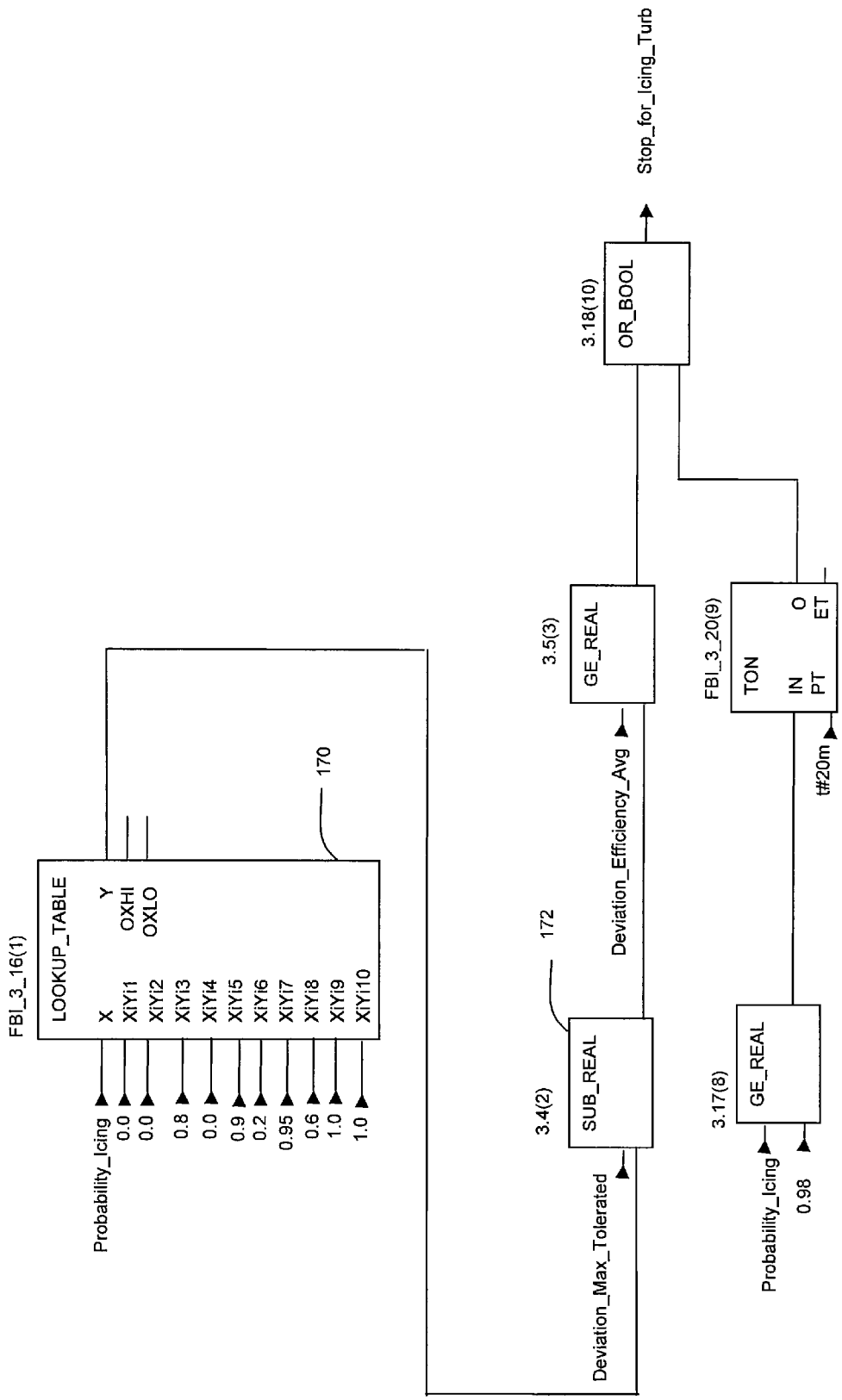
Figure 7A:
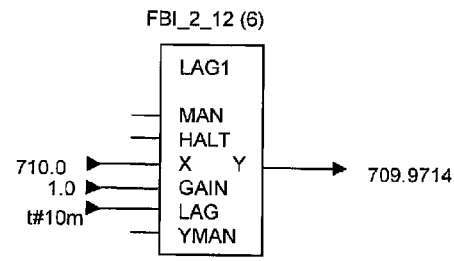
FIGS. 7A to 7E represent a detailed block diagram of the CALCULATE_AVERAGES process of the wind turbine control system in FIG. 1, showing a first example with numerical data.
Figure 7B:
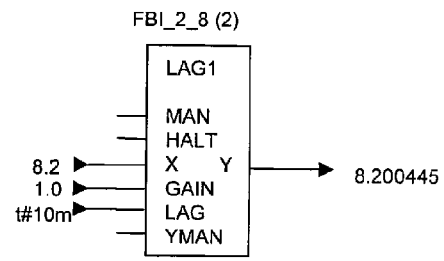
Figure 7C:
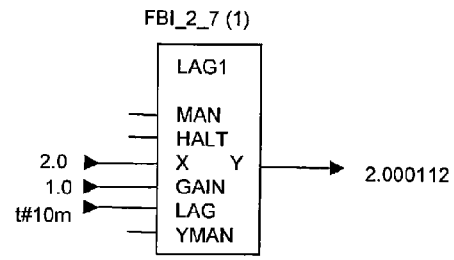
Figure 7E:
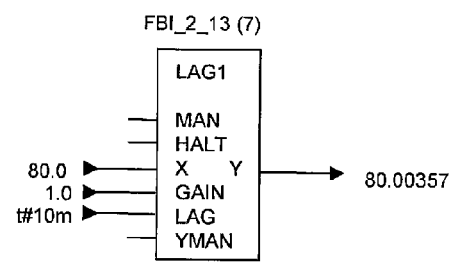
Figure 7D:
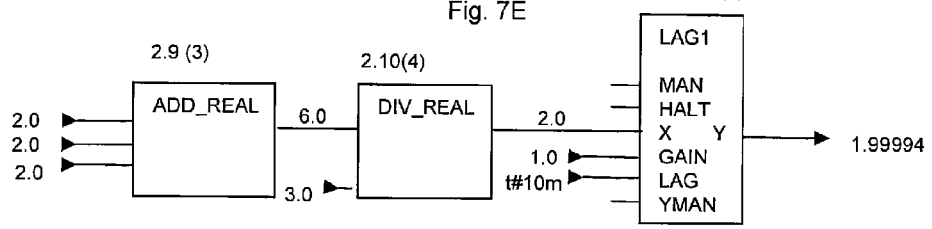
Figure 8A:
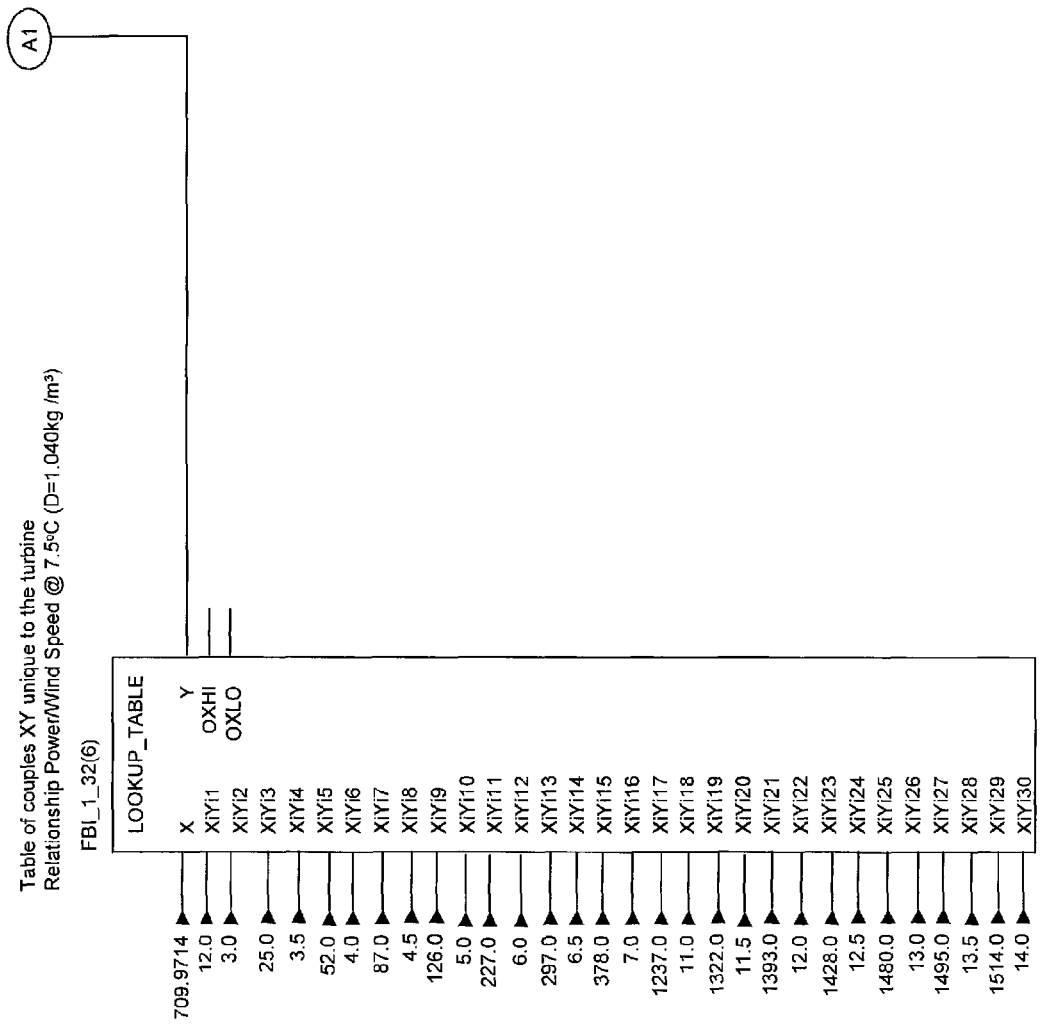
FIGS. 8A to 8D represent a detailed block diagram of the MEASURE_EFFICIENCY process of the wind turbine control system in FIG. 1, showing a first example with numerical data.
Figure 8B:
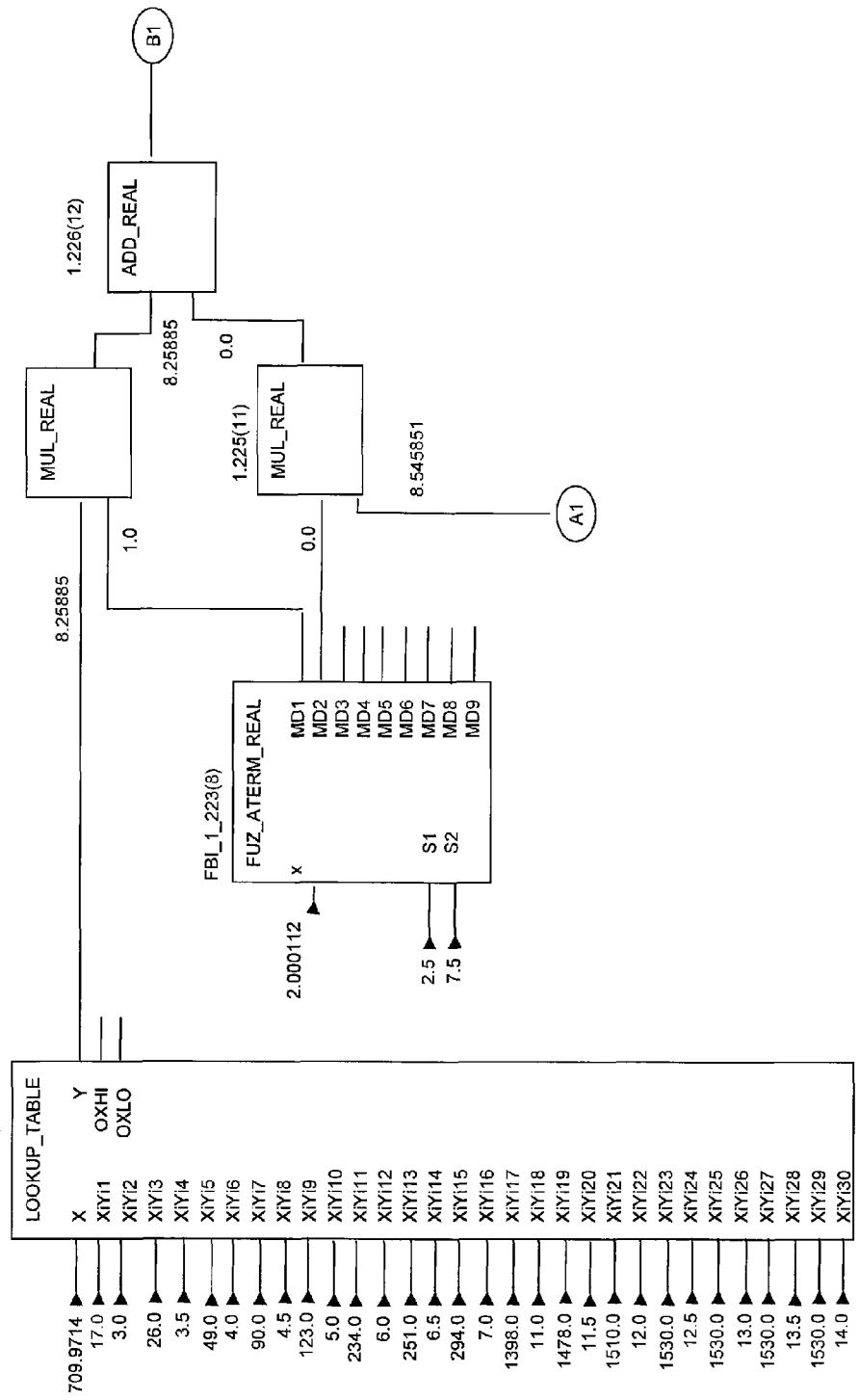
Figure 8C:
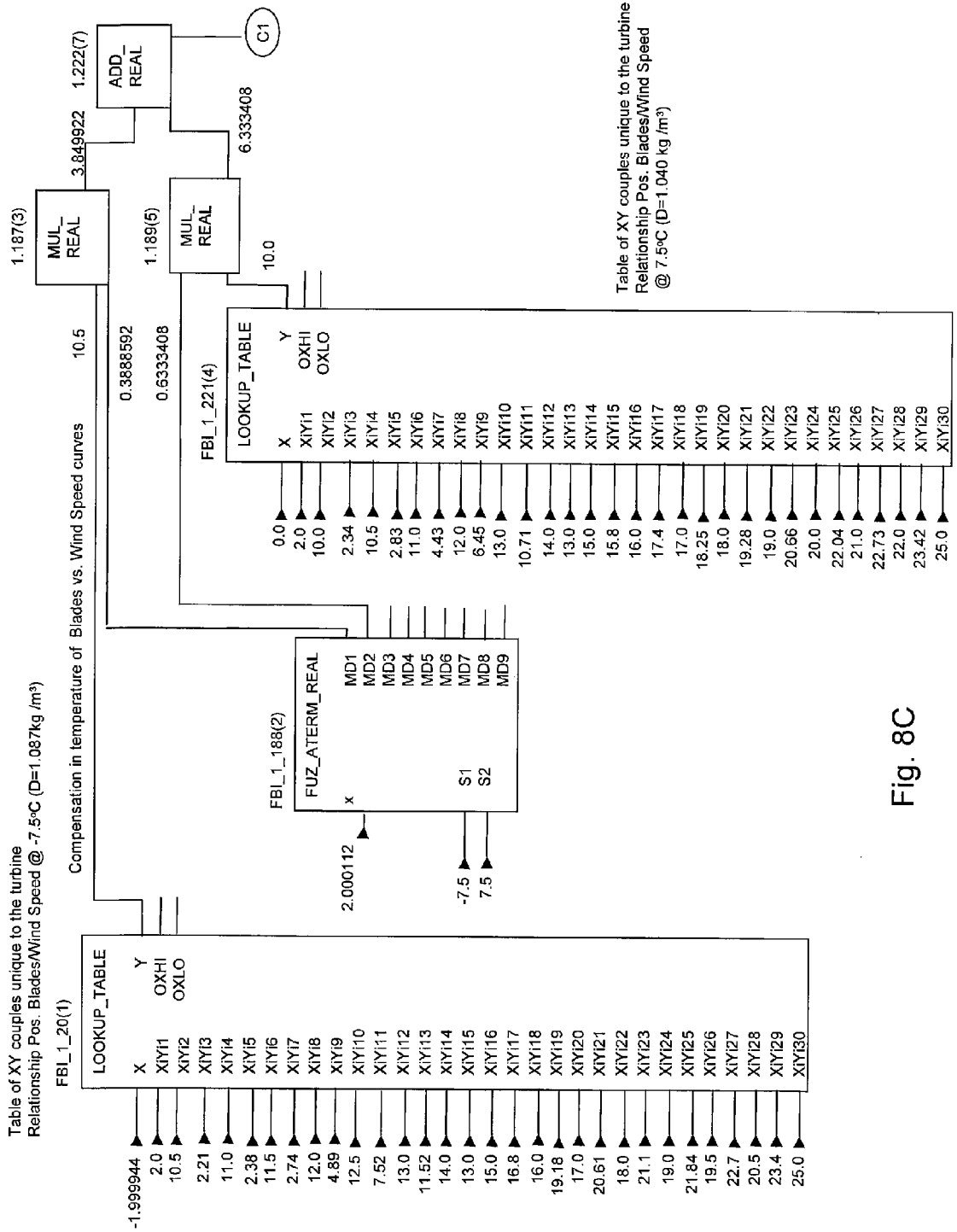
Figure 8D:
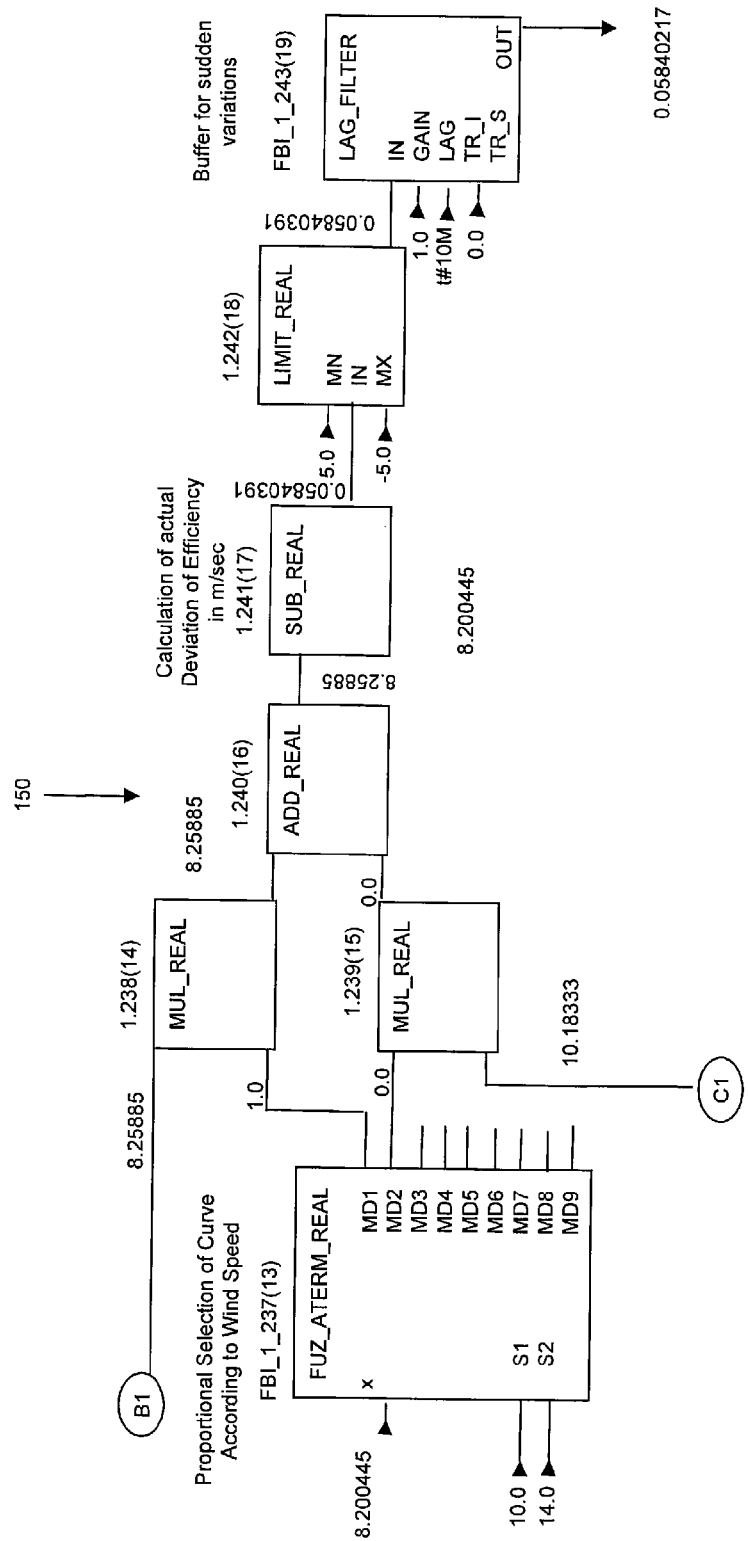
Figure 9A:
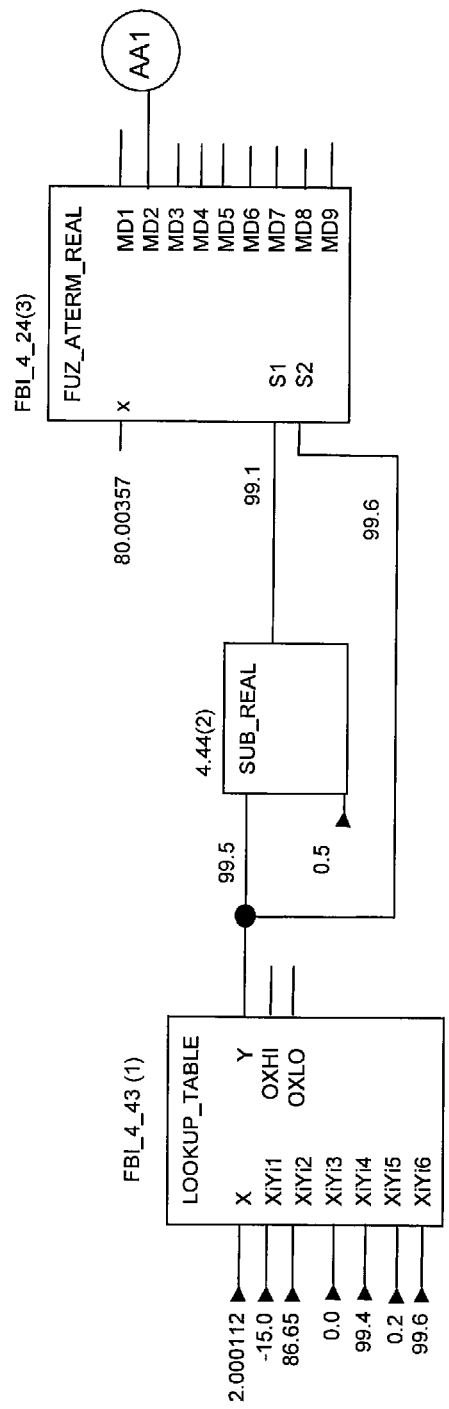
FIGS. 9A to 9D represent a detailed block diagram of the CALCULATE_PROB_ICE process of the wind turbine control system in FIG. 1, showing a first example with numerical data.
Figure 9B:
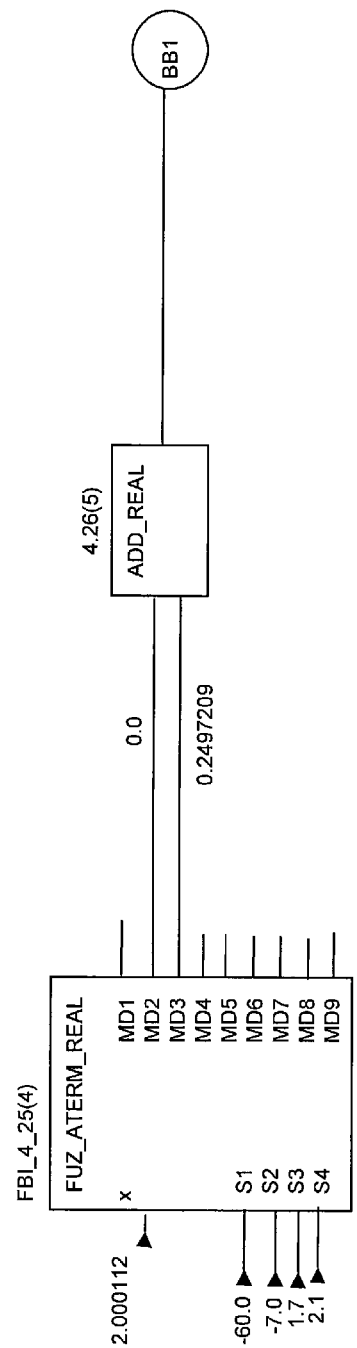
Figure 9C:
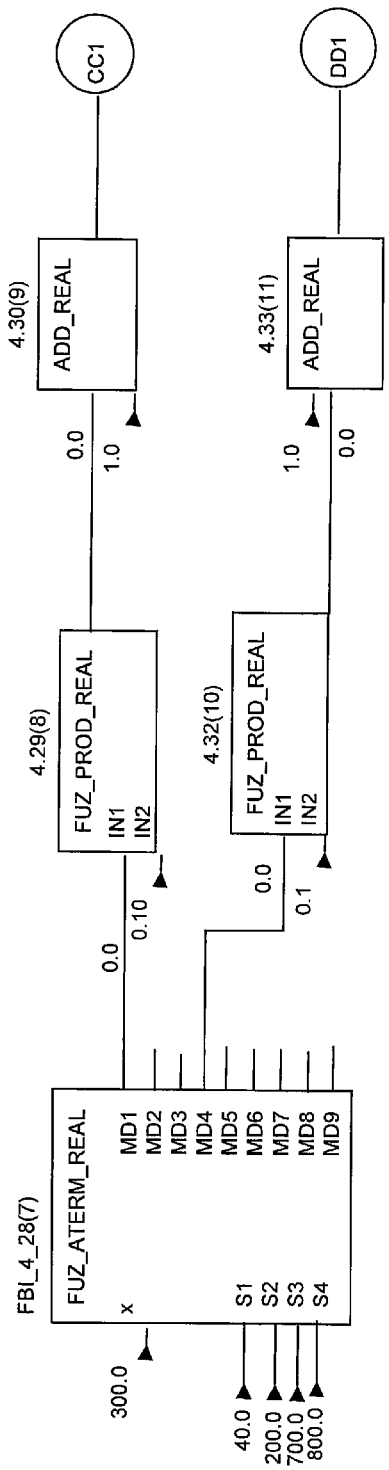
Figure 9D:
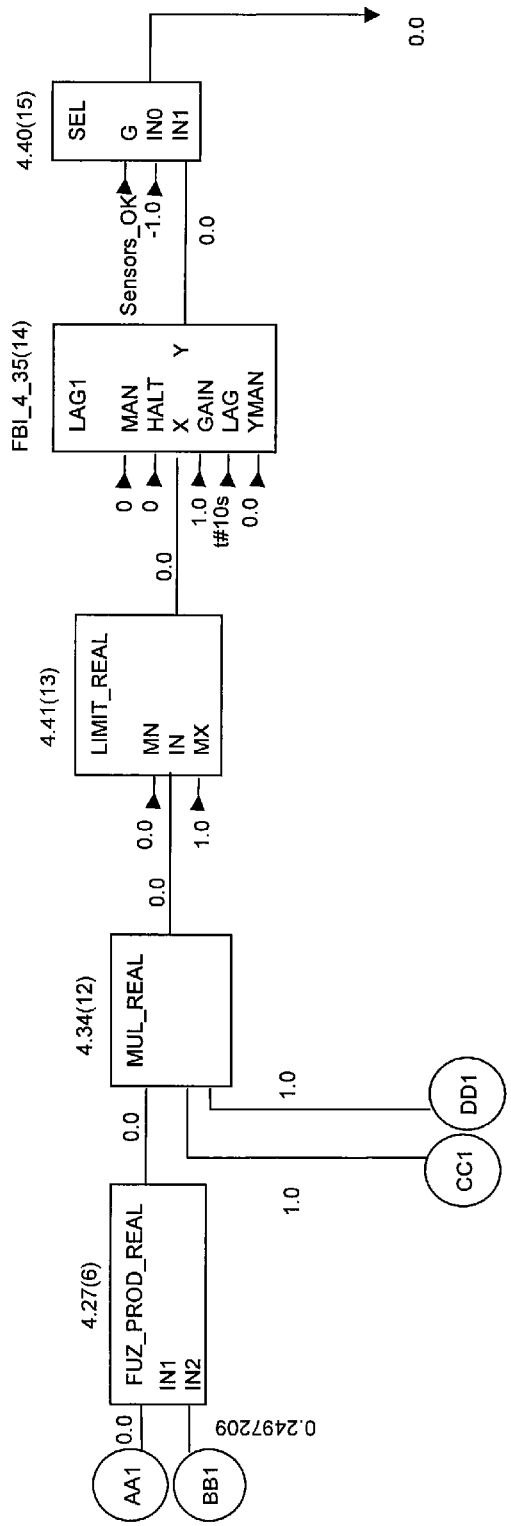
Figure 10:
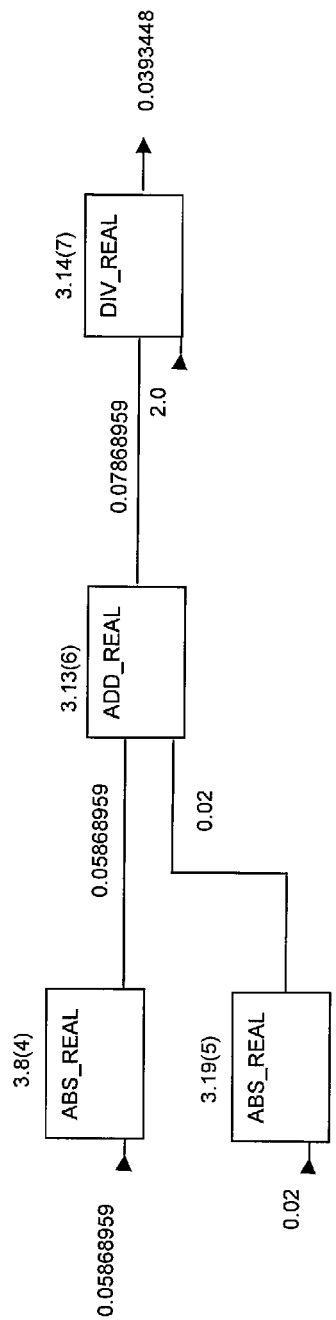
FIGS. 10 and 11 represent a detailed block diagram of the STOP_MANAGEMENT process of the wind turbine control system in FIG. 1, showing a first example with numerical data.
Figure 11:
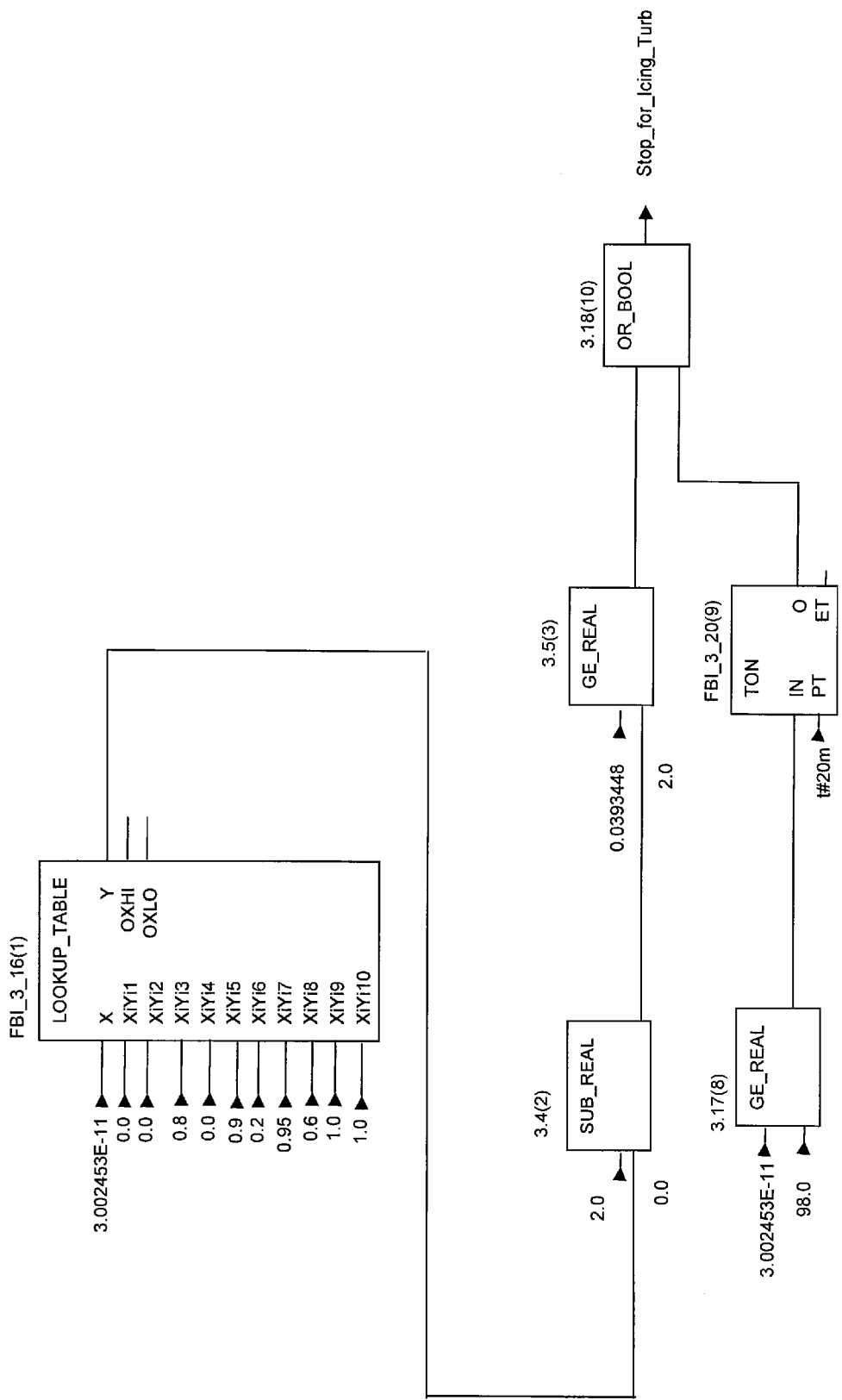
Figure 13A:
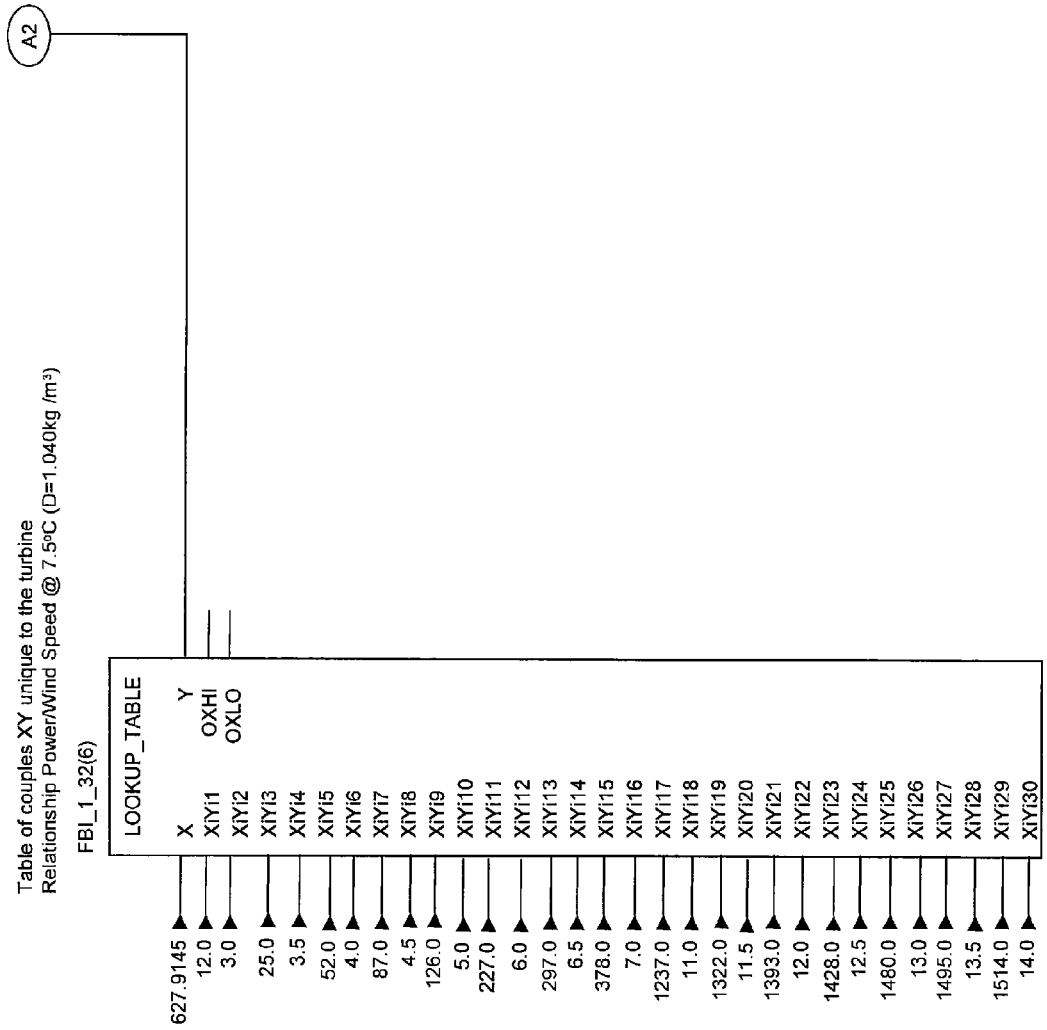
FIGS. 13A to 13D represent a detailed block diagram of the MEASURE_EFFICIENCY process of the wind turbine control system in FIG. 1, showing a second example with numerical data.
Figure 13B:
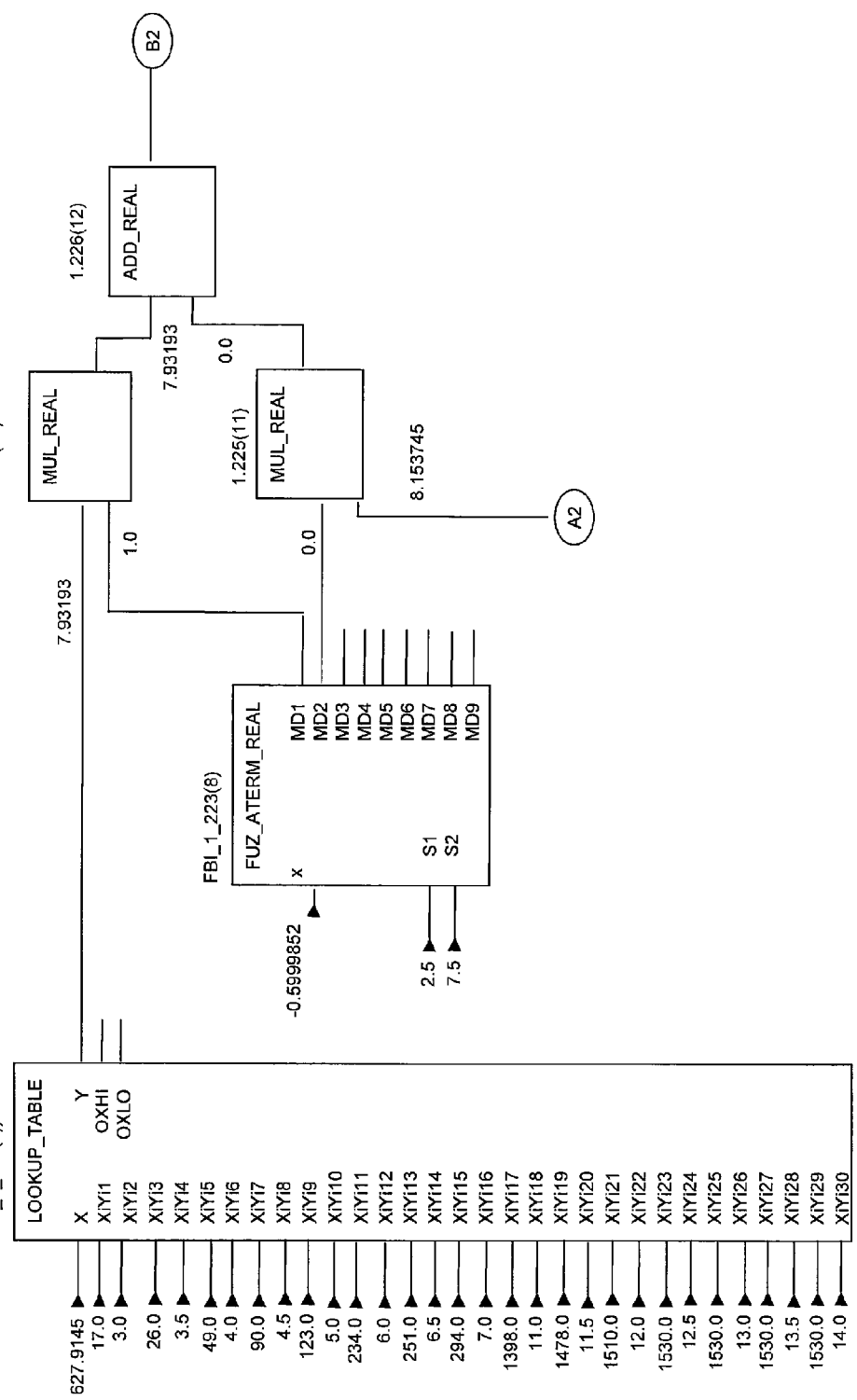
Figure 13C:
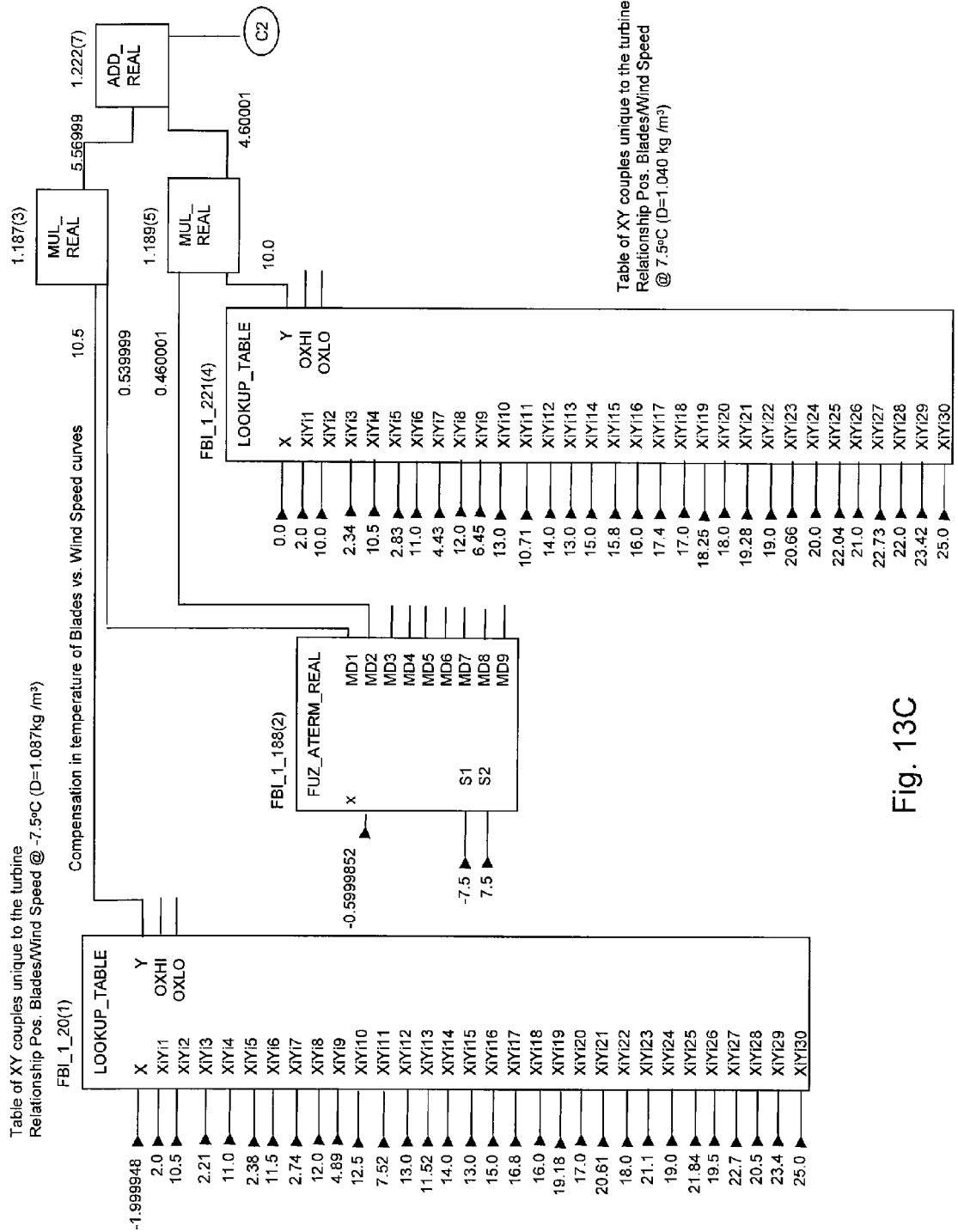
Figure 13D:
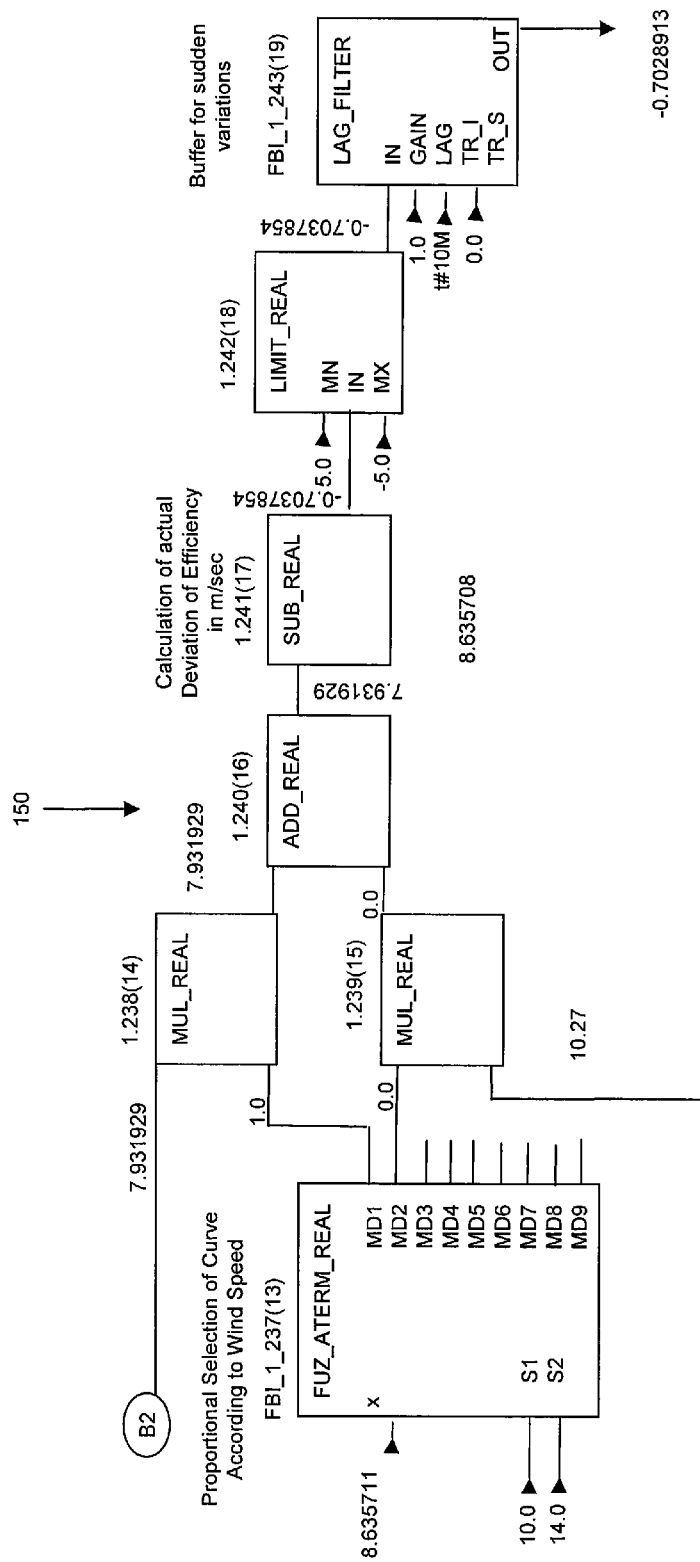
Figure 14A:
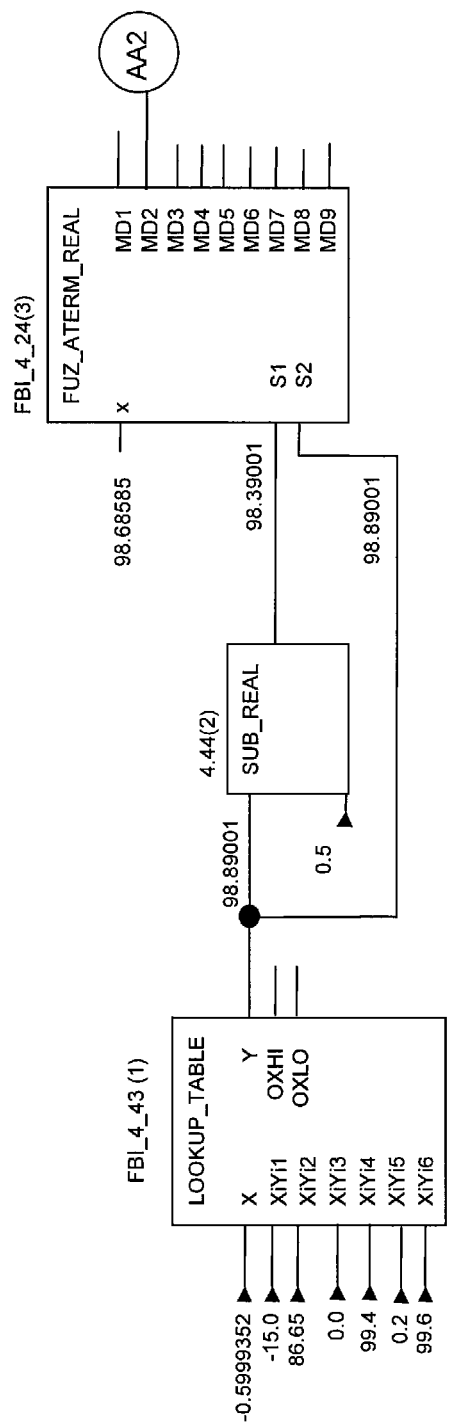
FIGS. 14A to 14D represent a detailed block diagram of the CALCULATE_PROB_ICE process of the wind turbine control system in FIG. 1, showing a second example with numerical data.
Figure 14B:
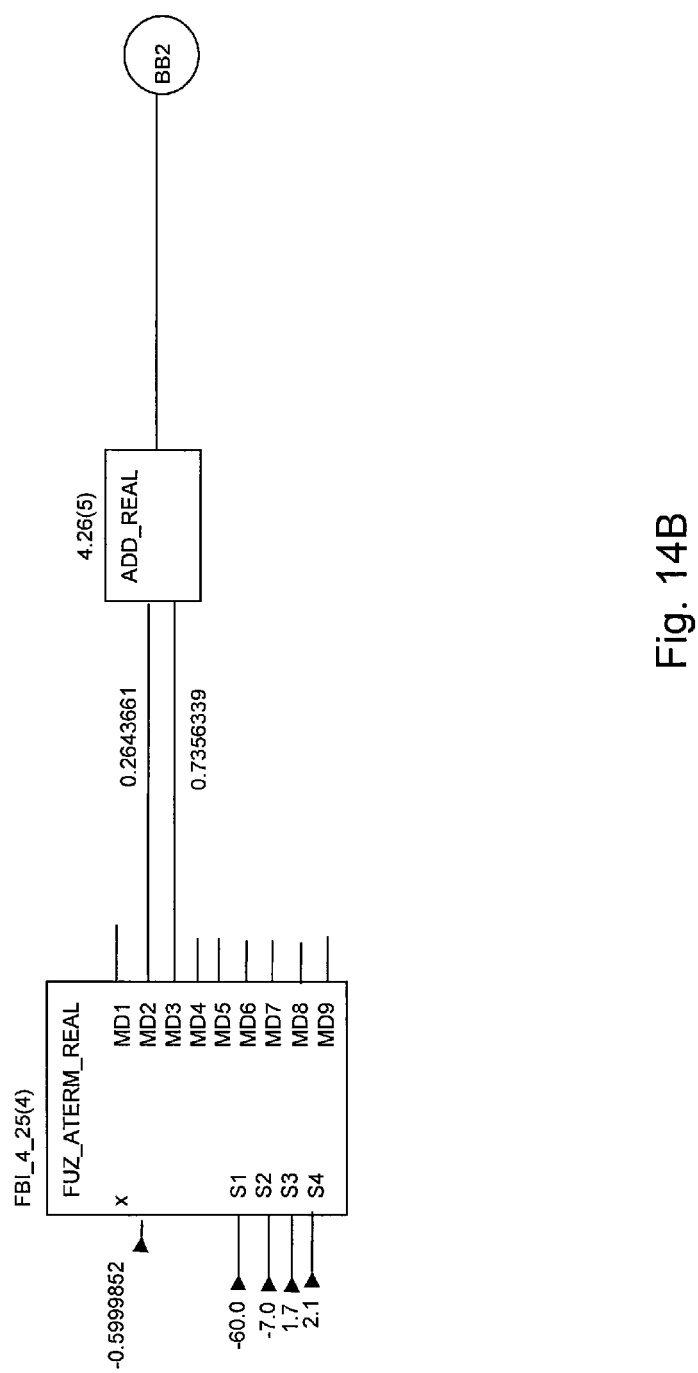
Figure 14C:
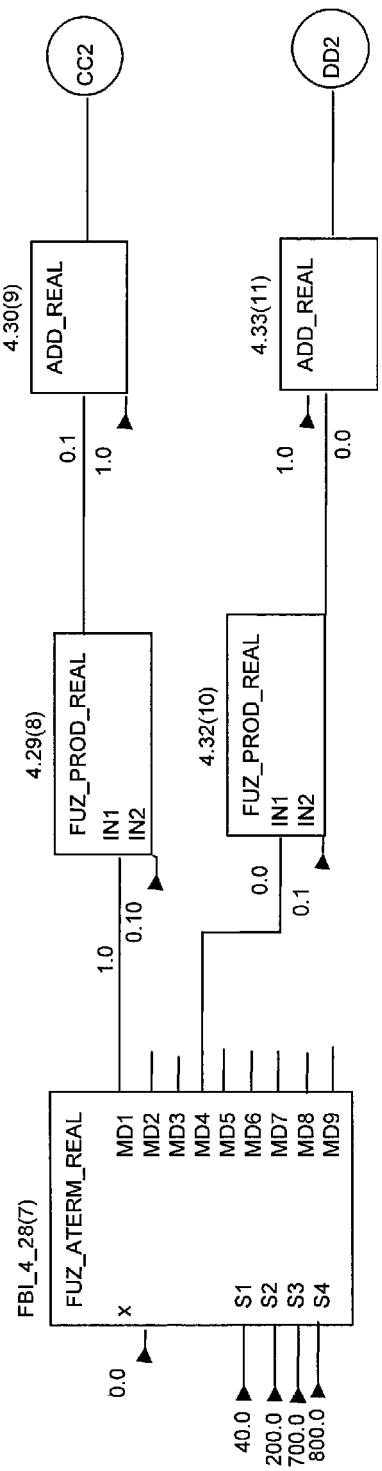
Figure 14D:
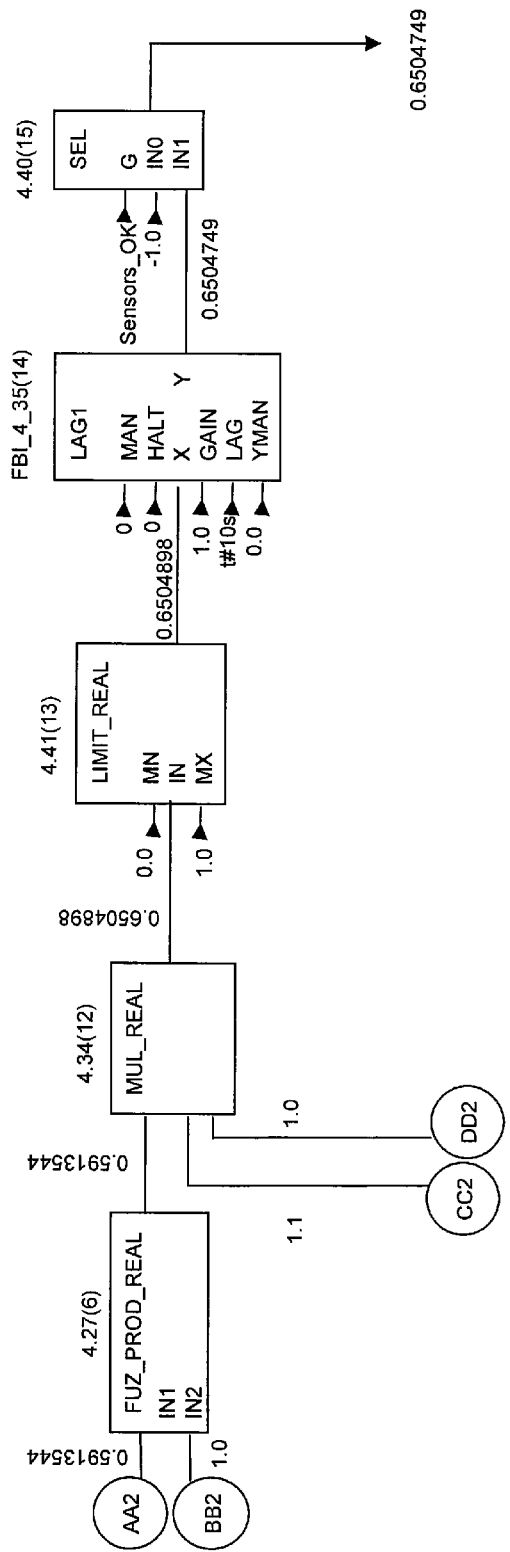
Figure 15:
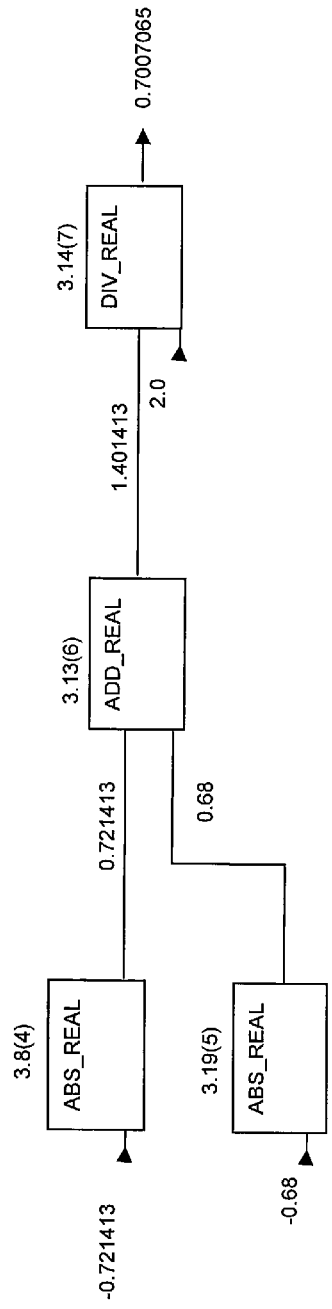
FIGS. 15 and 16 represent a detailed block diagram of the STOP_MANAGEMENT process of the wind turbine control system in FIG. 1, showing a second example with numerical data.
Figure 16:
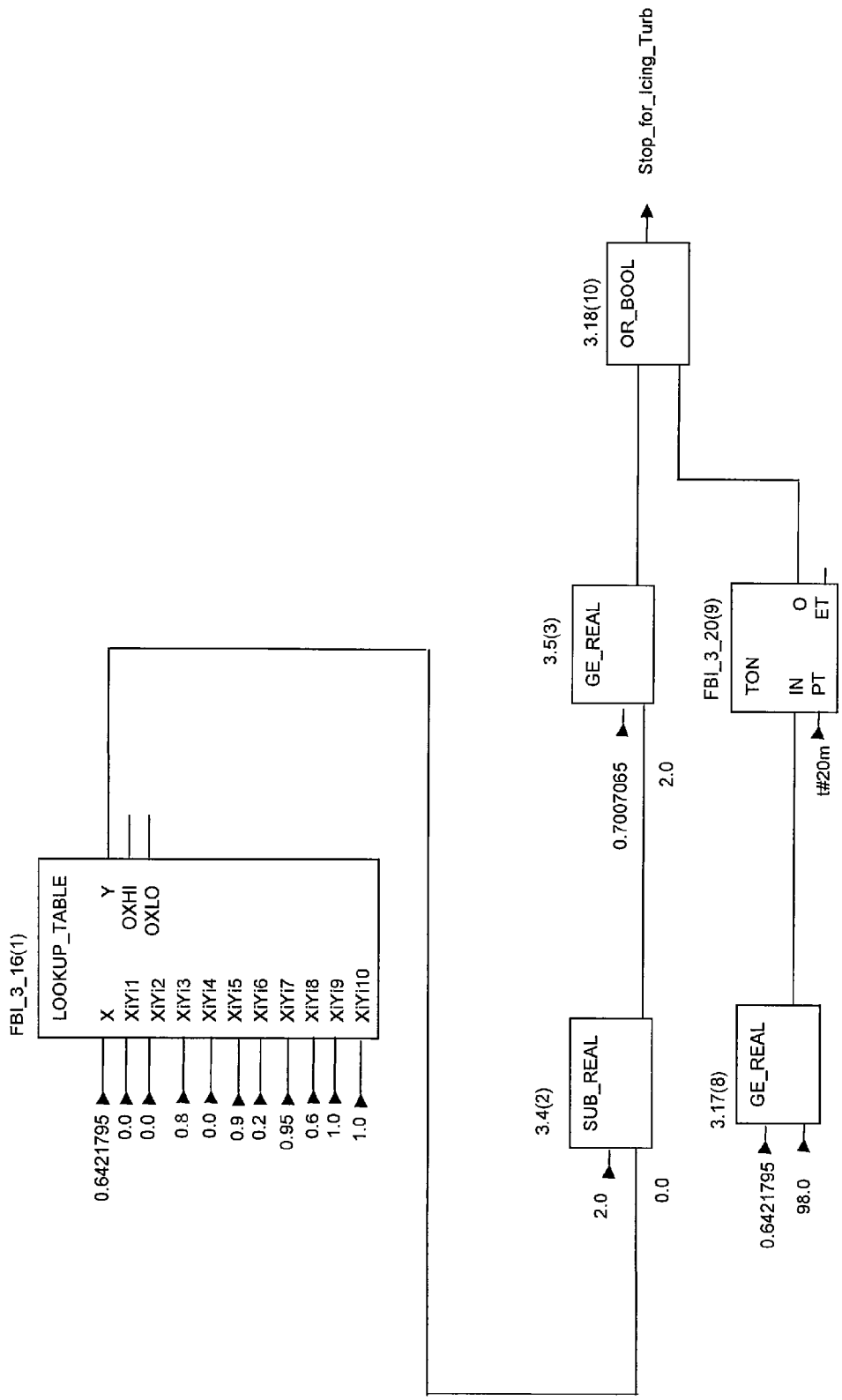
Figure 17A:
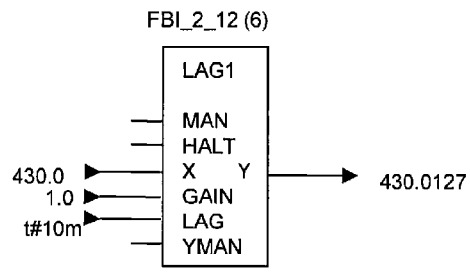
FIGS. 17A to 17E represent a detailed block diagram of the CALCULATE_AVERAGES process of the wind turbine control system in FIG. 1, showing a third example with numerical data.
Figure 17B:
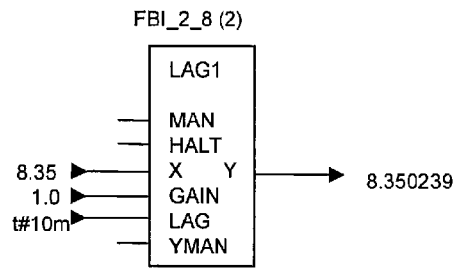
Figure 17C:
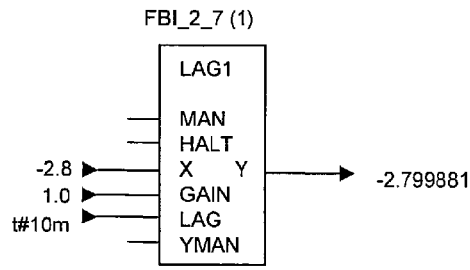
Figure 17E:
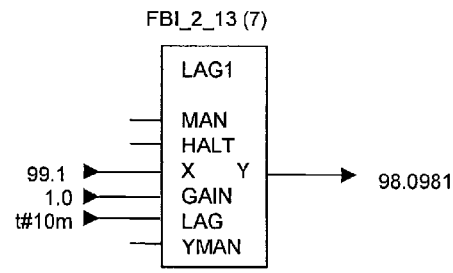
Figure 17D:
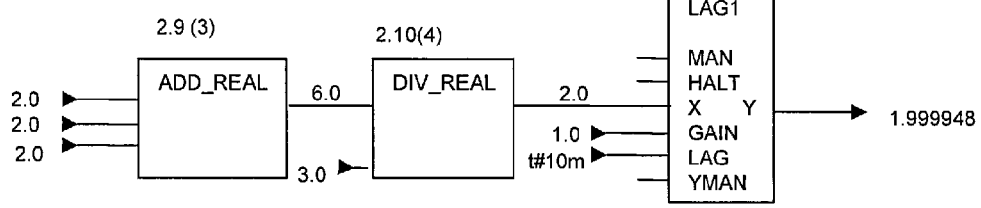
Figure 18A:
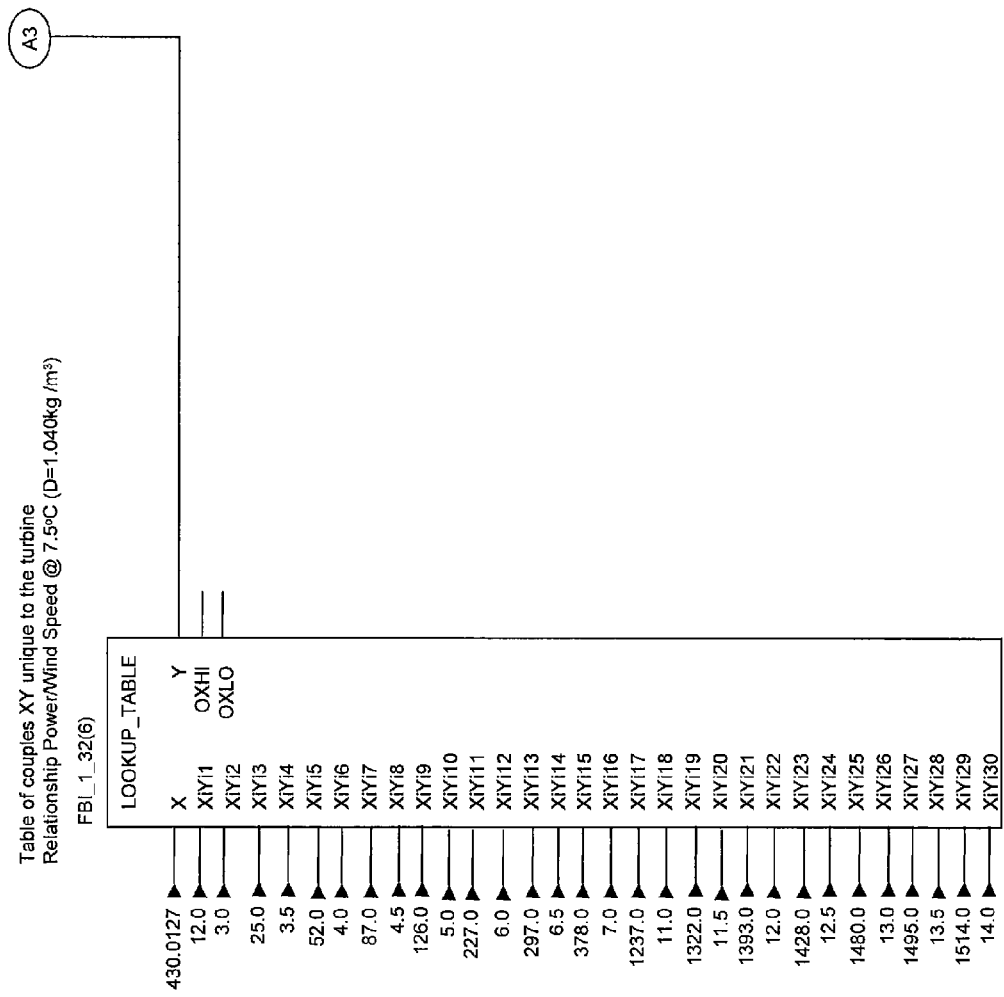
FIGS. 18A to 18D represent a detailed block diagram of the MEASURE_EFFICIENCY process of the wind turbine control system in FIG. 1, showing a third example with numerical data.
Figure 18B:
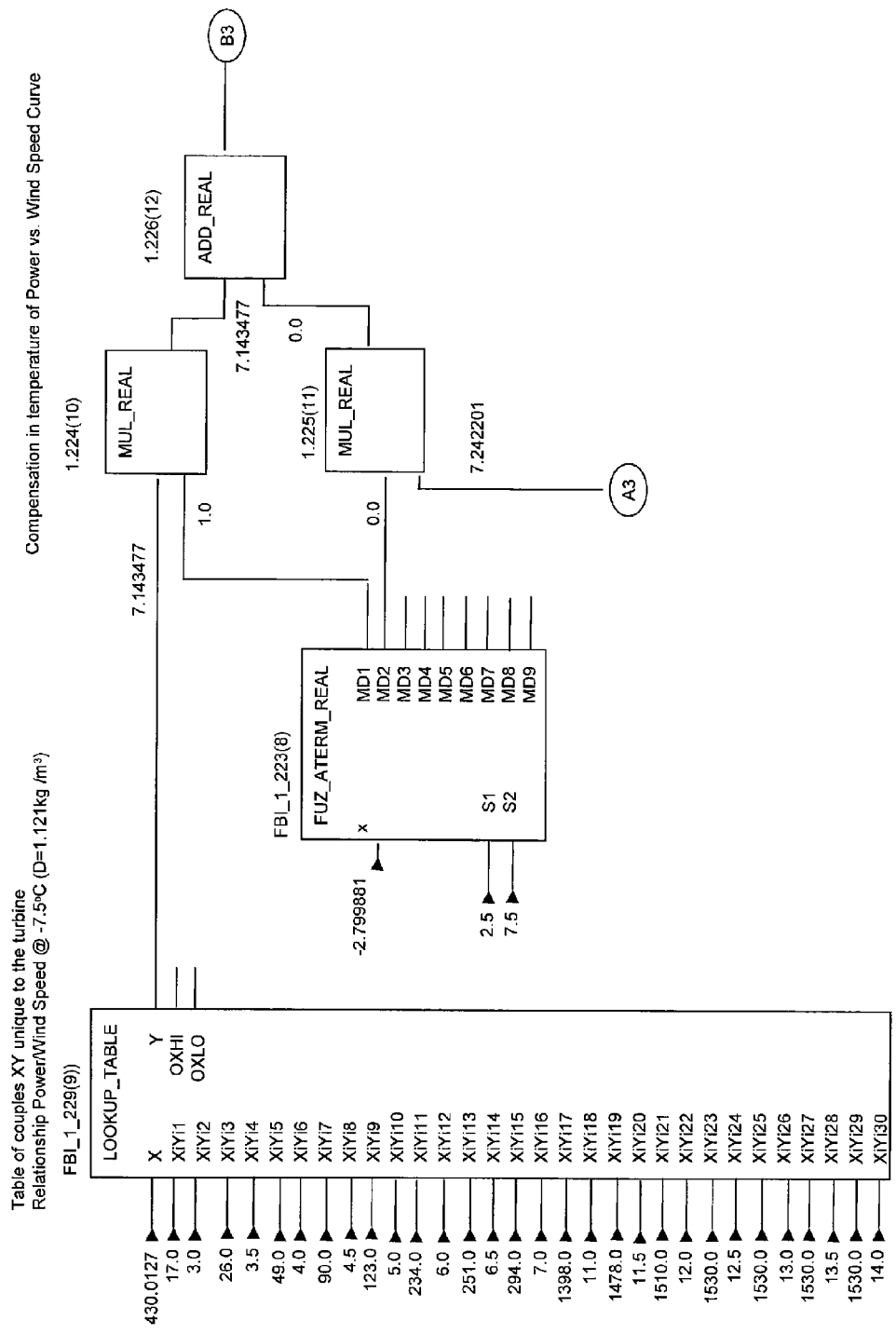
Figure 18C:
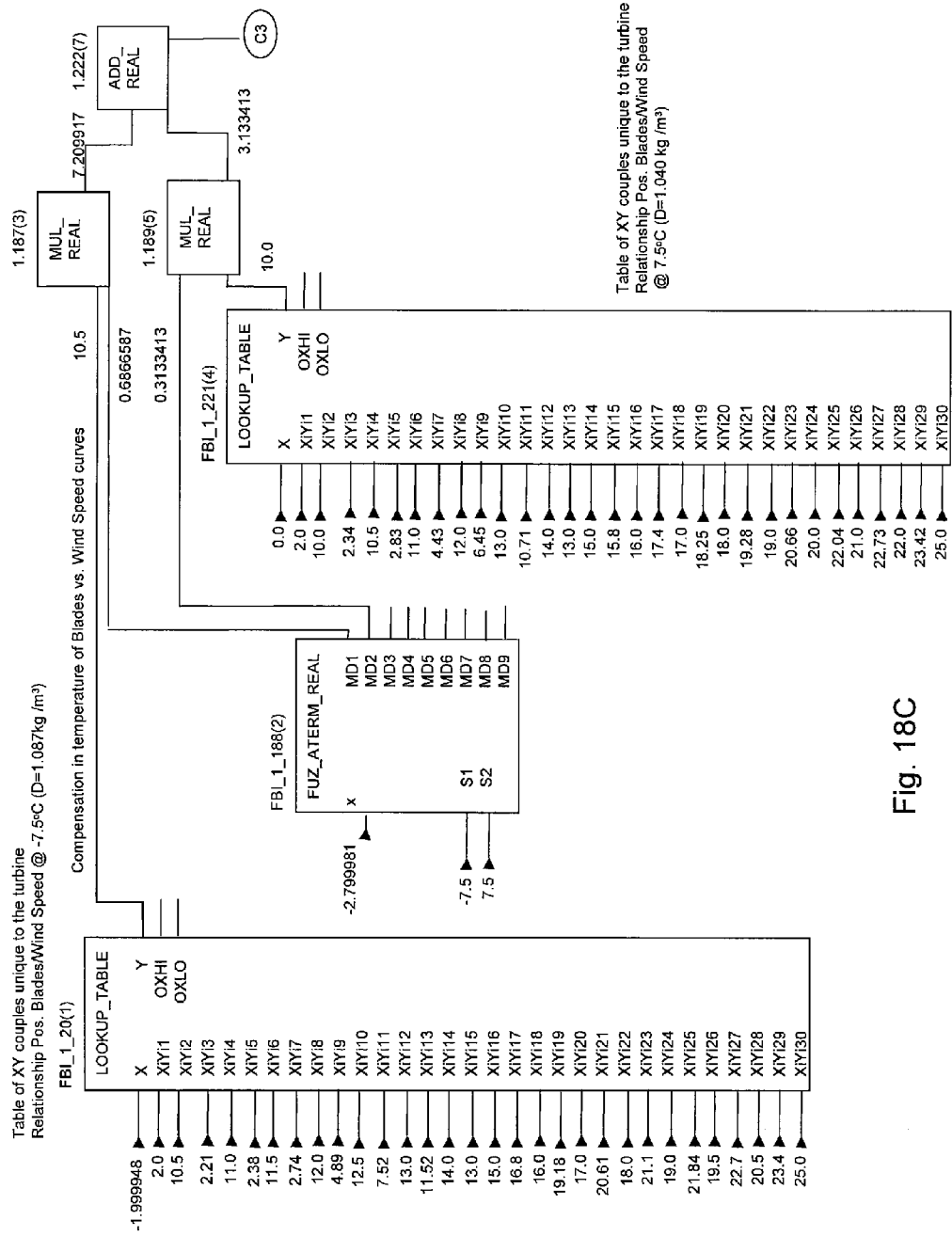
Figure 18D:
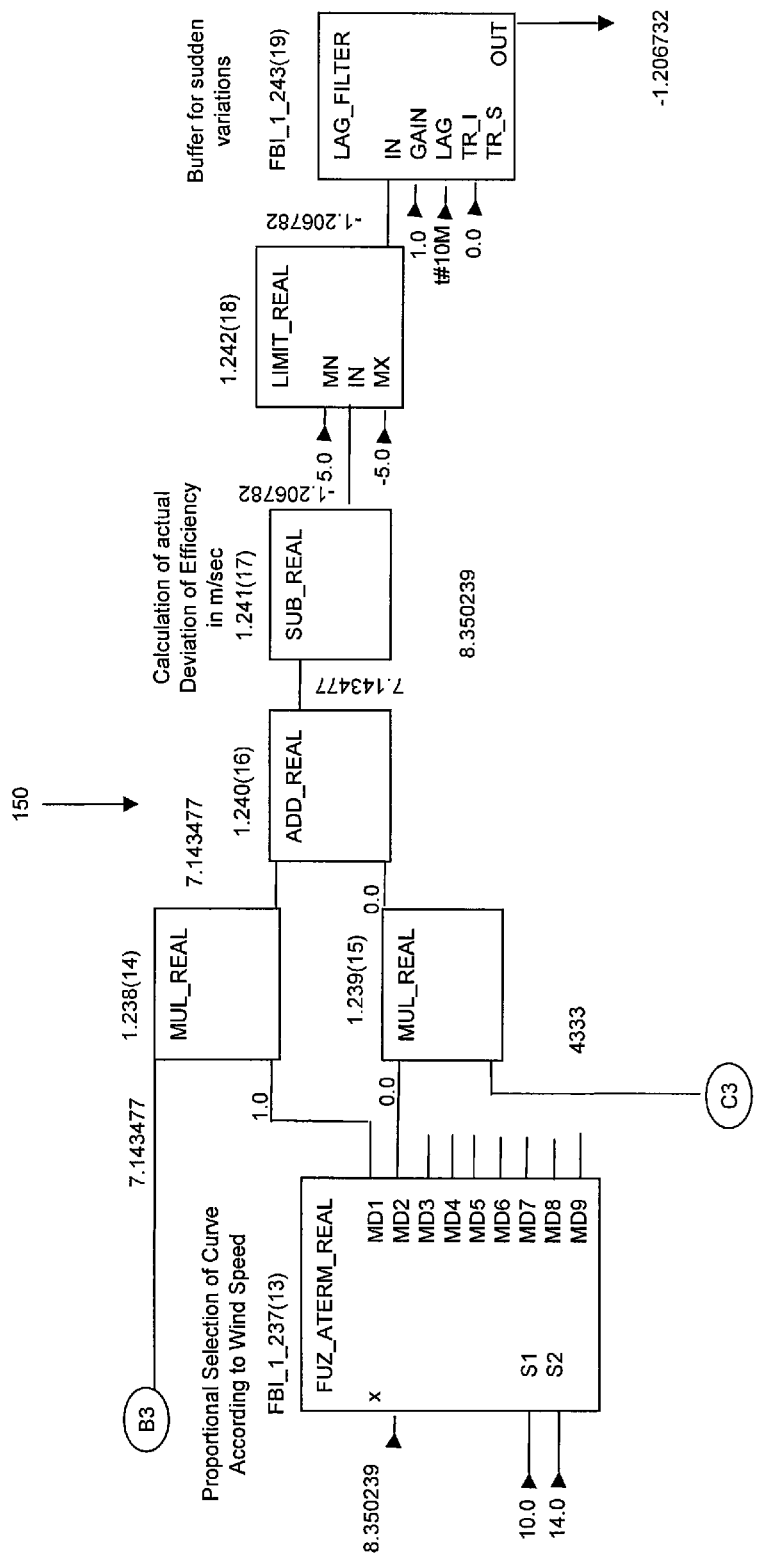
Figure 19A:
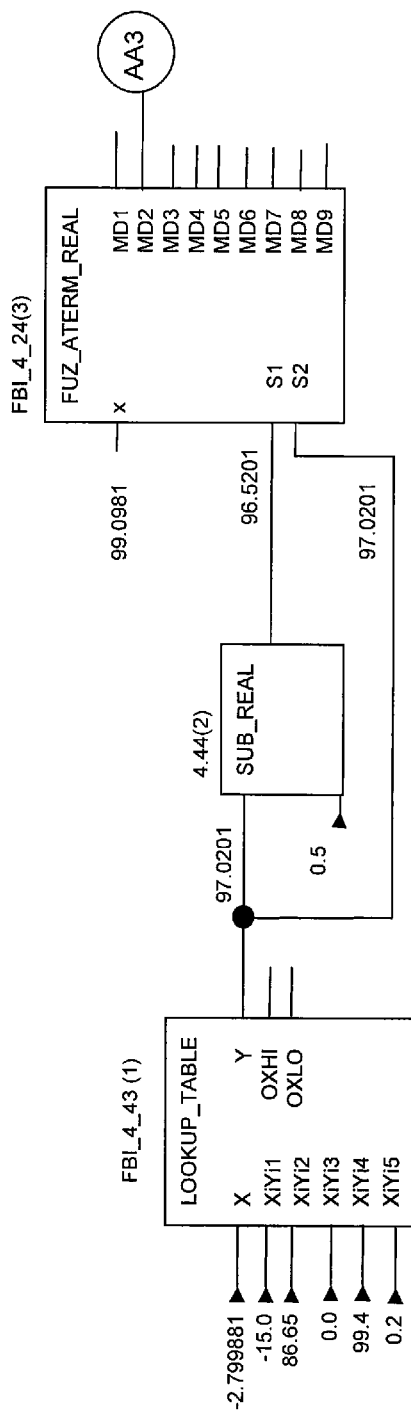
FIGS. 19A to 19D represent a detailed block diagram of the CALCULATE_PROB_ICE process of the wind turbine control system in FIG. 1, showing a third example with numerical data.
Figure 19B:
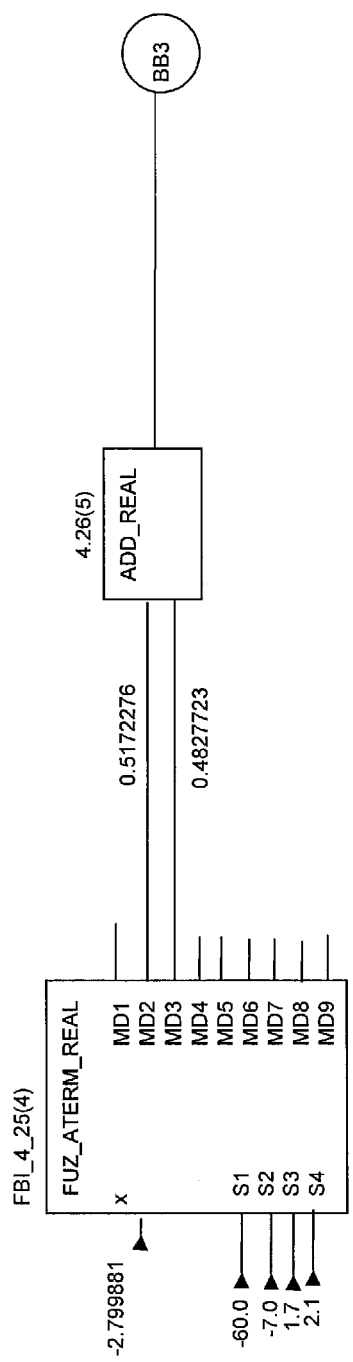
Figure 19C:
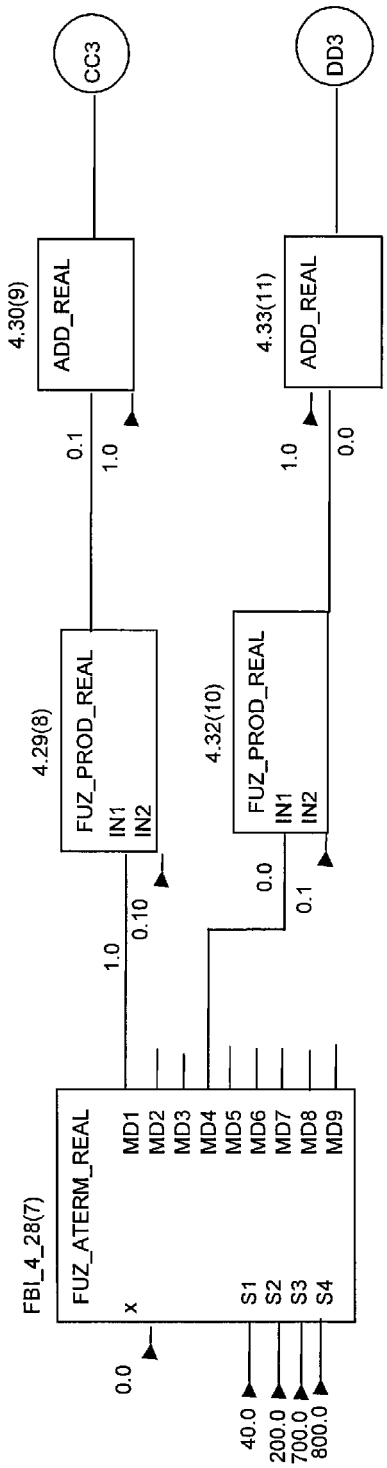
Figure 19D:
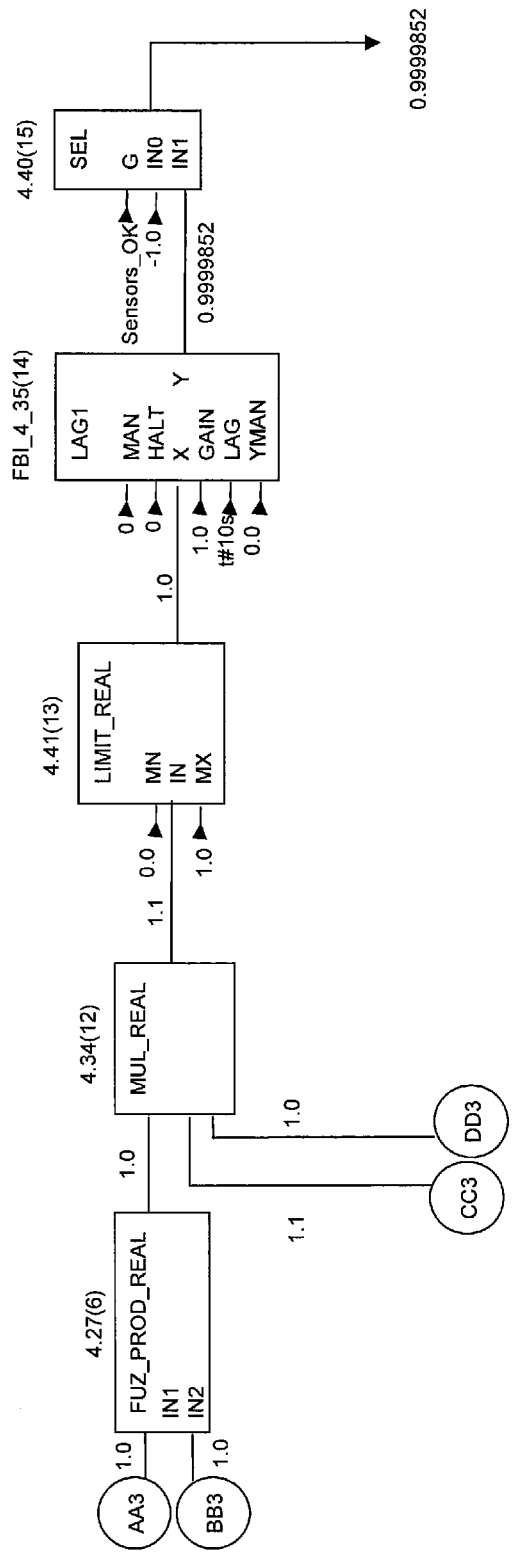
Figure 20:
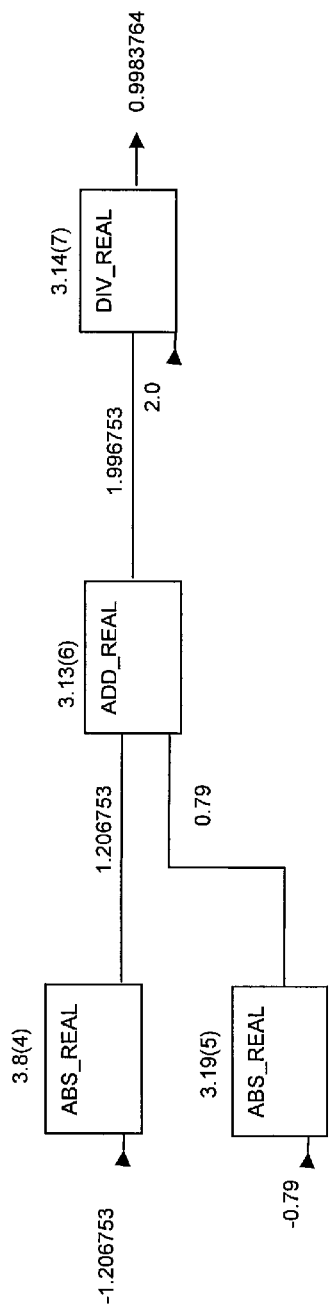
FIGS. 20 and 21 represent a detailed block diagram of the STOP_MANAGEMENT process of the wind turbine control system in FIG. 1, showing a third example with numerical data.
Figure 21:
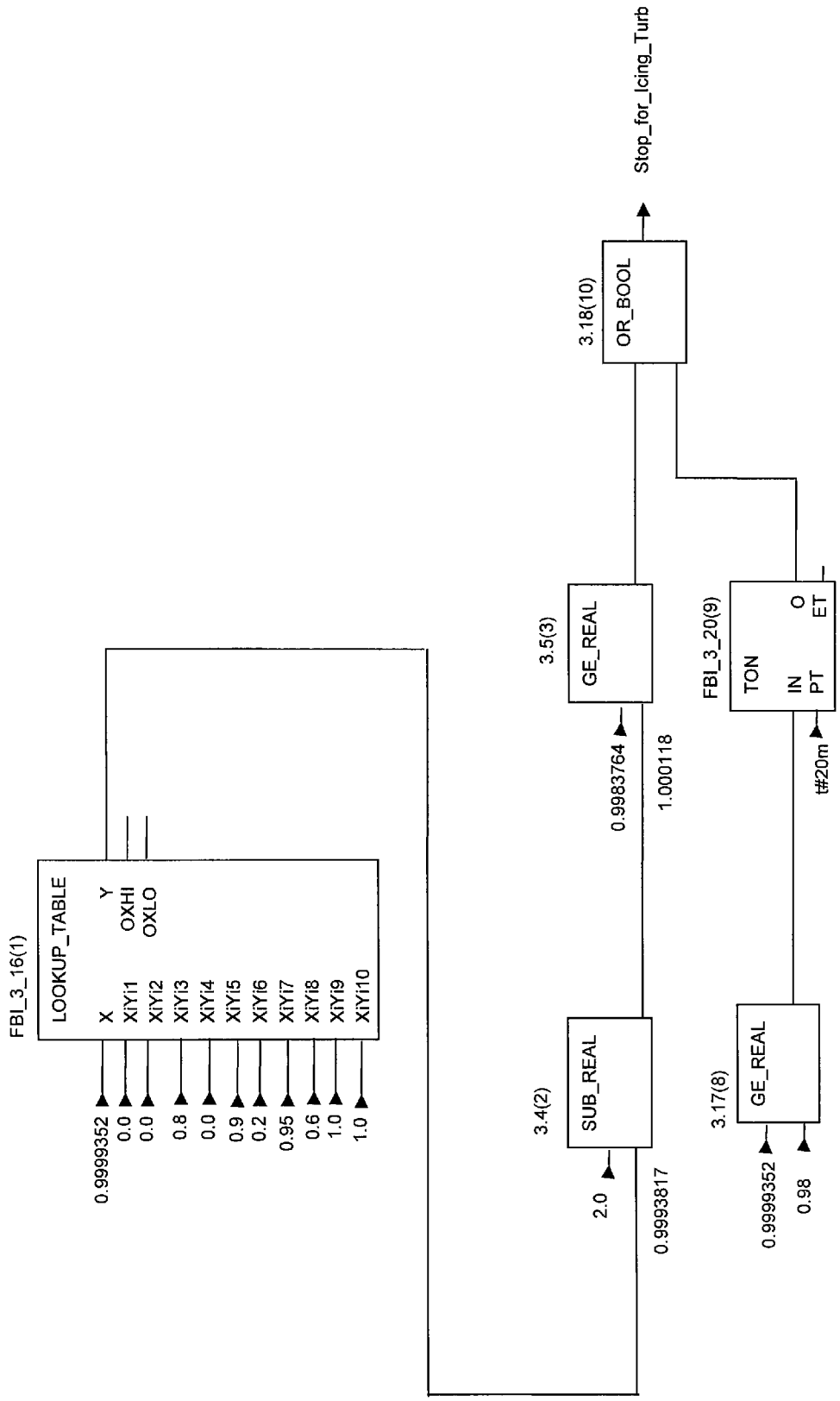

Preferably, as shown in FIG. 6, the first calculator comprises a twenty-third means for comparing the overall probability of icing with an excess probability, preferably 98%, activating a timer if the value of the overall probability of icing is equal or greater than the excess probability, resetting the timer if the value of the overall probability of icing is less than the excess probability, and the controller stops the wind turbine if the timer remains active for a duration exceeding a critical time period, preferably 20 minutes.

Figure 5:
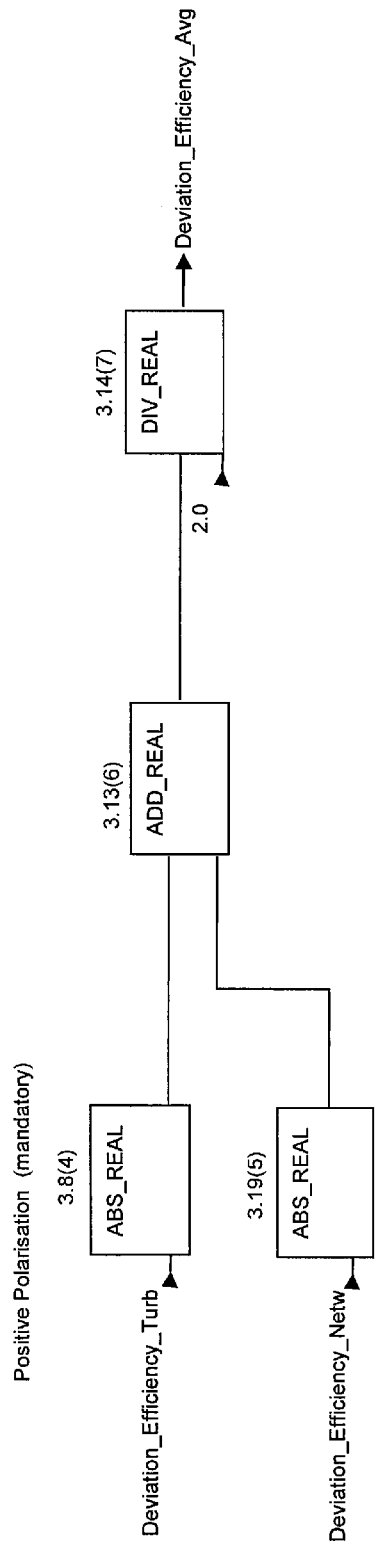
FIGS. 5 and 6 represent a detailed block diagram of the STOP_MANAGEMENT process of the wind turbine control system in FIG. 1.

Preferably, as shown in FIG. 5, the second calculator comprises a means 160 for adjusting the deviation between the actual efficiency and the average efficiency for the wind turbine before comparing the deviation to the deviation tolerance, by adding to the deviation a deviation average between the actual efficiency and the average efficiency for a series of other wind turbines adjacent to said wind turbine comprising the control system and by dividing the result of the addition by two. This process allows adding of a consideration of the effect of a group of wind turbines as a whole to the deviation which will then be used to verify if the tolerance is exceeded or not.

Preferably, the memory stores reference efficiency curves and an efficiency deviation tolerance. Moreover, the system further comprises sensors for detecting the average power generated by the wind turbine, an average position of the wind turbine blades, and an average wind speed proximate the wind turbine, and generating efficiency signals based thereon. The system also comprises a second calculator for calculating an actual efficiency of the wind turbine based on the efficiency signals. As shown in FIG. 6, the system also comprises a third calculator comprising a first means 170 for calculating a sensitivity parameter associated with the overall probability of icing, said sensitivity parameter being obtained through interpolation of a characteristic curve of the sensitivity parameter as a function of the probability of icing, and a second means 172 for calculating an adjusted efficiency deviation tolerance by subtracting the sensitivity parameter from the efficiency deviation tolerance. The controller stops the wind turbine when a deviation between the actual efficiency and the average efficiency calculated based on the reference efficiency curves is greater than the adjusted efficiency deviation tolerance.

The invention also provides a method for controlling a wind turbine, comprising the steps of:

measuring ambient climatic conditions, and generating meteorological signals based thereon;

storing in a memory an icing tolerance;

calculating an overall probability of icing based on the meteorological signals; and stopping the wind turbine when the overall probability of icing is greater than the icing tolerance.

Preferably, the method for controlling the wind turbine further comprises the steps of:

storing in the memory reference efficiency curves and an efficiency deviation tolerance;

detecting an average power generated by the wind turbine, an average position of the wind turbine blades, and an average wind speed proximate the wind turbine, and generating efficiency signals based thereon;

calculating an actual efficiency of the wind turbine based on the efficiency signals;

stopping the wind turbine when a deviation between the actual efficiency and an average efficiency calculated based on the reference efficiency curves is greater than the efficiency deviation tolerance.

Preferably, according to this method, the climatic conditions comprise an average ambient temperature proximate the wind turbine, an average ambient relative humidity proximate the wind turbine, and an average ambient solar influx proximate the wind turbine and step c) comprises the sub-steps of:
i) calculating a first relative humidity setting associated with the average ambient temperature, said first setting being obtained through interpolation of a first characteristic curve of the relative humidity characteristic settings as a function of a characteristic ambient temperature;
ii) calculating a second relative humidity setting resulting from a subtraction of a lower limit value from the first setting;
iii) calculating a first partial probability of icing corresponding to a first degree of approach between 0.0 and 1.0 of the ambient average humidity towards a first setting according to a fuzzification operation in order to obtain membership degrees of the ambient average humidity towards the first setting and the second setting;
iv) calculating a second degree of approach and a third degree of approach between 0.0 and 1.0 of the average ambient temperature towards a lower limit temperature and an upper limit temperature respectively according to a fuzzification operation in order to obtain membership degrees of the ambient average temperature to a series of temperatures comprising the lower limit temperature, the upper limit temperature, at least one additional temperature lower than the lower limit temperature and at least one additional temperature greater than the upper limit temperature;
v) calculating a second partial probability of icing by adding the second degree of approach and the third degree of approach;
vi) calculating a third partial probability of icing by multiplying the first partial probability of icing and the second partial probability of icing;
vii) calculating a fourth degree of approach and a fifth degree of approach between 0.0 and 1.0 of the average ambient solar influx towards a lower limit solar influx and an upper limit solar influx respectively according to a fuzzification operation to obtain membership degrees of the average ambient solar influx to a series of values of solar influx comprising the lower limit solar influx and the upper limit solar influx and at least two other values of solar influx between the lower limit solar influx and the upper limit solar influx;
viii) calculating a solar influx upward adjustment parameter according to the formula:

upward adjustment parameter=((fourth degree of approach)×0.1)+1.0;

ix) calculating a solar influx downward adjustment parameter according to the formula:

downward adjustment parameter=1.0−((fifth degree of approach)×0.1);

x) calculating an amplified probability of icing by multiplying the third partial probability of icing by the upward adjustment parameter and the downward adjustment parameter; and
xi) calculating the probability of icing which is equal to the amplified probability of icing if the amplified probability of icing is equal or lower than 1.0 and the probability of icing is equal to 1.0 if the amplified probability of icing is greater than 1.0.

Preferably, step g) comprises the sub-steps of:
xii) calculating a first theoretical wind speed associated with the average power generated by the wind turbine, said first theoretical wind speed being obtained through interpolation of a second characteristic curve of power generated as a function of wind speed at a lowest temperature measured proximate the wind turbine;
xiii) calculating a second theoretical wind speed associated with the average power generated by the wind turbine, said second theoretical wind speed being obtained through interpolation of a third characteristic curve of power generated as a function of wind speed at a highest temperature measured proximate the wind turbine;
xiv) calculating a sixth degree of approach and a seventh degree of approach between 0.0 and 1.0 of the average ambient temperature towards a first critical temperature and a second critical temperature respectively according to a fuzzification operation to obtain membership degrees of the average ambient temperature towards the first critical temperature and the second critical temperature;
xv) calculating a first intermediate theoretical wind speed by multiplying the sixth degree of approach by the first theoretical wind speed, a second intermediate theoretical wind speed by multiplying the seventh degree of approach by the second theoretical wind speed and a third intermediate theoretical wind speed by adding the first intermediate theoretical wind speed and the second intermediate theoretical wind speed;
xvi) calculating a third theoretical wind speed associated with the average position of the wind turbine blades, said third theoretical wind speed being obtained through interpolation of a third characteristic curve of the position of the blades as a function of the wind speed at the lowest temperature measured proximate the wind turbine;
xvii) calculating a fourth theoretical wind speed associated with the average position of the wind turbine blades, said fourth theoretical wind speed being obtained through interpolation of a fourth characteristic curve of the position of the blades as a function of the wind speed at the highest temperature measured proximate the wind turbine;
xviii) calculating an eighth degree of approach and a ninth degree of approach between 0.0 and 1.0 of the average ambient temperature towards a third critical temperature and a fourth critical temperature respectively according to a fuzzification operation for obtaining membership degrees of the average ambient temperature towards the third critical temperature and the fourth critical temperature;
xix) calculating a fourth intermediate theoretical wind speed by multiplying the eighth degree of approach by a third theoretical wind speed, a fifth intermediate theoretical wind speed by multiplying the ninth degree of approach by the fourth theoretical wind speed, and a sixth intermediate theoretical wind speed by adding the fourth intermediate theoretical wind speed and the fifth intermediate theoretical wind speed;
xx) calculating a tenth degree of approach and an eleventh degree of approach between 0.0 and 1.0 of the average wind speed proximate the wind turbine towards a first critical wind speed and a second critical wind speed respectively according to a fuzzification operation to obtain membership degrees of the average wind speed towards the first critical wind speed and the second critical wind speed;
xxi) calculating a seventh intermediate theoretical wind speed by multiplying the tenth degree of approach by the third intermediate theoretical wind speed, an eighth intermediate theoretical wind speed by multiplying the eleventh degree of approach by the sixth intermediate theoretical wind speed, and a ninth intermediate theoretical wind speed by adding the seventh intermediate theoretical wind speed and the eighth intermediate theoretical wind speed; and xxii) calculating the deviation between the actual efficiency and average efficiency by subtracting the average wind speed proximate the wind turbine from the ninth intermediate wind speed.

Preferably, the method for controlling the wind turbine according to the present invention further comprises the step of adjusting the deviation between the actual efficiency and average efficiency for the wind turbine before comparing the deviation to the deviation tolerance, by adding to the deviation an average of deviations between the actual efficiency and average efficiency for a series of other wind turbines adjacent to the wind turbine comprising the control system and by dividing the result of the addition by two.

Preferably, the method for controlling the wind turbine according to the invention, further comprises the steps of:

e) storing in the memory the reference efficiency curves and an efficiency deviation tolerance;

f) detecting an average power generated by the wind turbine, an average position of the wind turbine blades, and an average wind speed proximate the wind turbine, and generating efficiency signals based thereon;

g) calculating an actual wind turbine efficiency based on the efficiency signals;

h) calculating an adjustment parameter associated with the overall icing probability, said adjustment parameter being obtained through interpolation of a characteristic curve of the adjustment parameter as a function of the probability of icing;

i) calculating a deviation tolerance of the adjusted efficiency by subtracting the adjustment parameter from the efficiency deviation tolerance; and j) stopping the wind turbine when a deviation between the actual efficiency and an average efficiency calculated based on reference efficiency curves is greater than the adjusted efficiency deviation tolerance.

The objective of the invention is to anticipate the formation of ice on the wind turbine blades and to stop operation thereof until climatic conditions favourable for formation of ice disappear.

Implementation

As shown on FIG. 1, the system must include at least one automate (or any other system having similar characteristics) in which will be implemented the software (software mechanism of the wind turbine, of the components required for sending operational data from the wind turbine towards the automate and of the complete meteorological equipment including a temperature sensor, a relative humidity sensor and a solar influx measurement sensor (pyranometer). All components must be powered and inter-linked.

The software mechanism does sequentially and repetitively several tasks (processes) including principally the following:

Reading of climatic conditions and calculations of averages
(CALCULATE_AVERAGES process)
Measurement of wind turbine efficiency (MEASURE_EFFICIENCY process)
Calculation of icing index (CALCULATE_PROB_ICING process)
Emission of a stop command if required (STOP_MANAGEMENT process)

Reading of Climatic Conditions and Calculations of Averages:

As shown in FIGS. 2A to 2E, the system, through the CALCULATE_AVERAGES process, makes real time readings of climatic conditions (relative humidity, ambient temperature and solar influx). It uses these readings to calculate 10 minute averages in order to attenuate any sudden variation.

More particularly, this continuously running process uses real time data coming from the wind turbine network operational database (with an access to operational data from each of the wind turbines of the network) and calculates the 10 minute averages based on real time data. The goal of having 10 minute averages is to attenuate variations due to wind gusts and data communication delays.

The following table presents the input data for this process:

| INPUT | Description |
|---|---|
| Power_KW | Actual power delivered by the wind turbine in kW. Data originating from the network database. |
| Wind_Speed | Wind speed as seen by the wind turbine in m/sec. Data originating from the network database. |
| Act_Pos_Blade 1 | Actual position of wind turbine blade #1, in degrees. Data originating from the network database. |
| Act_Pos_Blade 2 | Actual position of wind turbine blade #2, in degrees. Data originating from the network database. |
| Act_Pos_Blade 3 | Actual position of wind turbine blade #3, in degrees. Data originating from the network database. |
| Ambient_Temp | Ambient temperature on the site in degrees Celcius. Data originating from the measurement instrument on the meteorological mast. |
| Relative_Humidity | Ambient relative humidity on the site, in %. Data originating from the measurement instrument on the meteorological mast. |

The following table identifies the bloc functions in FIGS. 2A to 2E:

| FIG. No. | Block code | Description |
|---|---|---|
| 2A | FBI_2_12 | Wind turbine power, calculation of 10 minute average |
| 2B | FBI_2_8 | Wind speed seen by wind turbine, calculation of 10 minute average |
| 2C | FBI_2_7 | Ambient temperature on the site, calculation of 10 minute average |
| 2D | FBI_2_9 à FBI_2_11 | Wind turbine blades position, calculation of 10 minute average |
| 2E | FBI_2_13 | Ambient relative humidity on the site, calculation of 10 minute average |

Measurement of Wind Turbine Efficiency

As shown in FIGS. 4A to 4D, the system through the MEASURE_EFFICIENCY process, receives operational data from the wind turbines coming from the wind turbine network database in order to compare the data with a reference production curve. The reference production curve is dynamically calculated based on an average compilation over a long period of the behaviour of each of the wind turbines as a function of wind speed, of the blade position, of produced power and of ambient temperature. With the help of this reference production curve, it becomes possible to estimate with precision what should be the real efficiency of the wind turbine in actual operational conditions and therefore to quantify any deviation in efficiency in real time, and this, for each of the wind turbines in the wind turbine network.

More particularly, this continuously running process measures the efficiency deviation based on 10 minute averages calculated in the CALCULATE_AVERAGES process and on XY curves representing a typical behaviour of the wind turbine as a function of wind speed.

The first step executed by the process is to find, through a correlation method, the wind speed theoretically associated with the actual power and/or the actual wind turbine blade position.

Based on a collection of data collected over a long recording period, four typical behaviour curves for the wind turbine have been recreated.

Two power curves as a function of wind speed are used:
A) A power curve at the lowest temperature measured on the site.
B) A power curve at the highest temperature measured on the site.

Since the wind turbine power levels off at a certain wind speed (in the example provided below: starting at 12.5 m/sec, the power levels off at 1530 KW), the system must transfer on the following curves the wind turbine blade position as a function of wind speed:
C) A curve of the wind turbine blade position at the lowest temperature measured on the site.
D) A curve of the wind turbine blade position at the highest temperature measures on the site.

The system continuously evaluates the actual ambient temperature as well as the actual wind speed in order to determine towards which of these four curves the system is orienting itself in order to find the proper wind speed theoretically associated with the actual power and/or actual wind turbine blade position.

The LOOKUP_TABLE blocks contain the four power and wind turbine blade position curves.

The FUZ_ATERM_REAL blocks determine the membership degree of the value found at the X input with respect to the support points S1 and S2. The membership degrees (between 0.0 and 1.0) are found at the outputs MD1 and MD2.

The LIMIT_REAL block has the function of imposing a minimum and maximum limit to the value found at the input IN. The output value will thus be equal to IN if the value of IN is between the MIN and MAX limits. Otherwise, the value is limited to MIN or MAX.

The other blocks such as MUL_REAL, ADD_REAL and SUB_REAL are standard mathematical blocks.

The second step executed by the process is to calculate the deviation in actual efficiency simply by subtracting the theoretical wind speed calculated from the actual wind speed. The deviation in measured efficiency will therefore be expressed in meters/second. This deviation measured efficiency is then passed through a filter (LAG_FILTER) whose function is to attenuate any sudden variation.

The following table presents the input data for this process:

| INPUT | Description |
|---|---|
| Power_KW_Avg. 10 M | 10 minute average power produced by the wind turbine in KW, as calculated in the CALCULATE_AVERAGES process. |
| Wind_Speed-Avg. 10 M | 10 minute average wind speed in meters/second, as calculated in the CALCULATE_AVERAGES process. |
| Pos_Blades_Avg. 10 M | 10 minute average of wind turbine blade position in degrees, as calculated in the CALCULATE_AVERAGES process. |
| Ambient_Temp_Avg. 10 M | 10 minute average temperature in degrees Celcius, as calculated in the CALCULATE_AVERAGES process. |

As an output, one obtains Deviation_Efficiency_Turb., a deviation of the measured efficiency for this wind turbine in meters/second.

The following table identifies the block functions in FIGS. 4A to 4D:

| FIG. No. | Block code | Description |
|---|---|---|
| 4A | FBI_4_43 | XY curve where: X is the ambient temperature Y is a relative humidity parameter The Y output is therefore a relative humidity parameter as a function of ambient temperature. |
| 4A | FBI_4_24 | Determines the membership degree (between 0.0 and 1.0) of the actual relative humidity towards the support points S1 and S2. The more the input X value found approaches S2, the more the output MD2 value approaches 1.0. |
| 4B | FBI_4_25 | Determines the membership degree (between 0.0 and 1.0) of the actual ambient temperature towards the support points S1, S2, S3 and S4. The more the input X value found approaches S2, the more the output value MD2 approaches 1.0. The more the input value X found approaches S3, the more the output value MD3 approaches 1.0. |
| 4B | FBI_4_26 | The addition of the membership degrees allows the determination that between −7° C. and 1.7° C., one will obtain an index = to 1.0. Consequently, it is between these two temperatures that the risk of formation of ice is the highest. |
| 4D | FBI_4_27 | Combination of membership degrees determined for ambient relative humidity and temperature. |
| 4C | FBI_4_28 | Determines the membership degree (between 0.0 and 1.0) of the solar influx towards the support points S1 and S2. The more the input X value found approaches S1, the more the output value MD1 approaches 1.0. |
| 4C | 4_29 et 4_32 | Calculation of an upper adjustment parameter as a function of solar influx. In a situation of low energy, the adjustment parameter will be increased. In situation of high energy, the adjustment parameter will be decreased. |
| 4C | 4_30 | Increase of adjustment parameter. |
| 4C | 4_33 | Decrease of adjustment parameter. |
| 4D | 4_41 | Limitation of the overall adjustment parameter. |
| 4D | 4_40 | Validates the following signals: relative humidity; temperature; and solar influx. If a sensor is defective, the probability index becomes −1. |

As shown in FIG. 5, in order to ensure that the deviation perceived on the wind turbine is also perceptible on the network of turbine as a whole, the wind turbine efficiency deviation is combined with the average efficiency deviation calculated for the network of wind turbines as a whole. This last combination is used by the system to determine if the wind turbine must be stopped for a deviation beyond a tolerance. Therefore, according to the process shown in FIG. 5, deviations are the object of a mandatory positive polarization. After that point, the wind turbine deviation and the average deviation of the complete group of wind turbines of the network are combined to obtain an adjusted average deviation.

Calculation of an Icing Parameter:

As shown in FIGS. 3A to 3D, the system, through its CALCULATE_PROB_ICING uses 10 minute average climatic data for manipulation through mathematical functions, preferably done through a fuzzy logic based process, for which the final result is an icing risk parameter. An icing study has been done in order to determine the climatic conditions that favour the formation of ice on wind turbine blades. The system therefore verifies continuously climatic conditions and calculates an approach parameter of conditions that are favourable towards the formation of ice.

More particularly, this continuous process calculates continuously an icing probability parameter as a function of climatic data read in real time on the site based on meteorological sensors installed on a meteorological mast preferably placed at the center of the network of wind turbines to be monitored.

With the help of readings of ambient temperature, ambient relative humidity and solar influx, the system can estimate the risks of formation of ice on the wind turbine blades of the network.

Following a study on the behaviour of climatic conditions that lead to the formation of ice on wind turbine blades, it has been possible to determine that relative humidity, ambient temperature, as well as solar influx play key roles in the process. It has also been possible to extract different combinations of these key factors for which is possible that ice forms on the wind turbine blades.

The following continuous process uses a temperature/humidity curve and fuzzification blocks in order to recreate different combinations of climatic conditions that favour the formation of ice on wind turbine blades. The outputs of the fuzzification blocks FUZ_ATERM_REAL indicate the degree of approach towards the climatic conditions that favours the formation of ice. All of the degrees of approach are then combined in order to create an overall adjustment factor for probability of icing.

The following table presents the input data for the process:

| INPUTS | Description |
| --- | --- |
| Humidity_Avg 10M | 10 minute average relative humidity in % as calculated by the CALCULATE_AVERAGES process. |
| Temp_Ambient_Avg 10M | 10 minute average temperature in degree Celcius, as calculated by the CALCULATE_AVERAGES process. |
| Sensors_OK | Validation bit of the meteorological sensor signals. The signals are validated by an external process in order to determine any erratic signal. If this is the case, the Sensors_OK bit goes to 0 resulting in a probability of icing adjustment parameter going to −1. The host system can then send an alarm signal to a system supervisor. |

As output data, one obtains Probability_Icing, a probability of formation of ice on wind turbine blades adjustment parameter expressed as a percentage. This adjustment parameter will be used in another process in order to adjust (decrease) the tolerance to the efficiency deviation (as shown in FIG. 6) or also to stop operation of the wind turbine when the interpretation of the adjustment parameter goes from "probability of icing" to "certainty of icing".

The next table identifies the functional blocks in FIGS. 3A to 3D:

| Figure number | Block code | Description |
| --- | --- | --- |
| 3A | FBI_1_32 | Table of XY parameters unique to the turbine. Relationship Power/Wind Speed @ 7.5° C. (D = 1.040 kg/M$^3$) |
| 3B | FBI_1_228 | Table of XY parameters unique to the turbine. Relationship of Power/Wind Speed @ −7.5° C. (D = 1.121 kg/M$^3$) |
| 3B | 1_224, 1_225 et 1_226 | Compensation for temperature of the Power vs Wind Speed curve. |
| 3C | FBI_1_20 | Table of XY parameters unique to the turbine. Relationship of Blade Position/Wind Speed @−7.5° C. (D = 1.087 kg/M$^3$) |
| 3C | FBI_1_221 | Table of XY parameters unique to the turbine. Relationship of Blade Position/Wind Speed @ 7.5° C. (D = 1.040 kg/M$^3$) |
| 3C | FBI_1_188 | Compensation for temperature of the Blade vs Speed curve. |
| 3D | FBI_1_237 | Proportional selection of curve to use according to wind speed. |
| 3D | 1_241 | Calculation of actual efficiency deviation in m/sec. |
| 3D | FBI_1_243 | Adjustment for sudden variations. |

Emission of a Stop Command

As shown in FIGS. 5 and 6, the system through the process MANAGE_STOP verifies in real time the icing probability adjustment parameters and the efficiency deviation for the network of wind turbine as a whole. When the average (calculated through the combination of the average efficiency deviation for the network of wind turbines and the wind turbine efficiency deviation being monitored) exceeds a tolerated limit, a stop command is sent to the wind turbine. The tolerated efficiency deviation limit is adjusted as a function of the icing probability adjustment parameter. The more the icing probability adjustment parameter is high, the more the efficiency deviation tolerance will be decreased. This has an effect of stopping the wind turbine at the first sign of accumulation of ice on the blades.

It is also possible that the system preventively commands a stop in the operation of the turbine if the icing probability adjustment parameter shows a very high probability for more than 20 minutes. This preventive stop of the wind turbine should limit accumulation of ice on the blades. Consequently, the stop time for de-icing should be minimized as well as any production losses associated with a prolonged stop.

More particularly, this continuously running process uses the measurement of efficiency deviation and the icing probability adjustment parameter in order to determine if the wind turbine must be stopped.

The first step executed by the process is to process the wind turbine efficiency deviations as well as those of the wind turbine network in order to polarize them positively (because it is effectively possible that the efficiency deviations be negative), and to calculate a new efficiency deviation which is in fact an average of the two efficiency deviations. The goal of the manoeuvre is to provide a "network effect" to the measurement of the efficiency deviation related to the wind turbine before adjusting a deviation caused by a malfunction of equipment required for reading of key data (power, blade position, wind speed). The adjustment from the "network effect" will come attenuate this error while ensuring that several wind turbines are affected by a significant efficiency deviation.

The second step executed by the process is to use an icing probability adjustment parameter for:

A) adjust (lower) the efficiency deviation tolerance parameter. The LOOKUP_TABLE block contains an adjustment curve that is a function of the icing probability parameter. The more the parameter is high (at input X), the more the adjustment parameter will also be high up to a value of 1.0 meter/second.

B) stop operation of the wind turbine if the parameter reaches a level of "certainty" for icing.

The last step executed by the process is to manage the stopping operation of the wind turbine in cases where:

A) the measurement of efficiency deviation exceeds a tolerance parameter.

B) the icing probability parameter shows a level of "certainty" of icing.

The following table presents the input data for this process:

| INPUTS | Description |
| --- | --- |
| Efficiency_Deviation_Turbine | The wind turbine efficiency deviation, in meters per second, as measured by the process MEASURE_EFFICIENCY. |
| Efficiency_Deviation_Network | The network efficiency deviation, in meters per second. It is in fact an average of all the Efficiency_Deviation_Turbine 1, 2, 3, . . . , representing the network. |
| Efficiency_Deviation_Avg | The average efficiency deviation calculated based on efficiency deviations of the wind turbine and of the network in meters per second. |
| Probability_Icing | The probability of icing parameter in % as calculated in the process CALCULATE_PROB_ICING. |
| Deviation_Tolerated | Maximum deviation tolerance parameter. This parameter is adjusted by taking into account several factors related to the wind turbine and may have a value between 1.0 and 5.0 meters/second. |
| Efficiency_Deviation_Avg | Average efficiency deviation calculated based on efficiency deviations of the wind turbine and of the network in meters per second. |

As output data, one obtains Stop_For_Icing_Turbine, a bit for commanding a stopping operation of the wind turbine. This bit will be sent to a process managing the stop/start commands for the wind turbine that are related to the wind turbine control system and excluded from the present patent application.

The following table identifies the bloc functions in FIGS. 5 and 6:

| FIG. No. | Block code | Description |
| --- | --- | --- |
| 5 | 3_8 et 3_19 | Positive polarization (mandatory) |
| 5 | 3_13 | The wind turbine deviation and average deviation for the network of wind turbines as a whole are combined to obtain an adjusted average deviation. |
| 6 | FBI_3_16 | The adjustment parameter is adjusted as a function of the icing probability parameter. The "Lookup Table" block contains XY values where brackets containing an uneven number are the X elements of the parameter and the brackets containing an even number are the Y elements of the parameter. |
| 6 | 3_4 | Adjustment of original parameter. |
| 6 | 3_5 | Verification if the adjusted deviation tolerance is exceeded. |
| 6 | 3_17 et FBI_3_20 | High probability for more than 20 minutes = certainty. |

Sample Calculations

The following sections show examples of calculations accomplished by the system through several hours of operation. The details of the calculations are shown in FIGS. 7A to 21.

Initial State (FIGS. 7A-11)
 The starting meteorological conditions are:
 Ambient temperature: 2° C.
 Relative humidity: 80%
 Solar influx: 300 Watts/m$^2$
 Result: Estimated icing risk=0.00% (Calculated according to FIGS. 9A-9D)
 Starting operational conditions for wind turbine:
 Wind speed: 8.2 Meter/sec
 Blade position: 2°
 Produced power: 710 KWatts
 Theoretical wind speed at 710 KWatts: 8.258 Meter/sec
 Wind turbine efficiency deviation: +0.058 Meter/sec (Calculated According to FIGS. 8a-8d)
 Deviation average for network of wind turbine as a whole: +0.02 Meter/sec
 Deviation average used: +0.039 Meter/sec (Calculated according to FIG. 10)
 Basic deviation tolerance: 2.0 Meter/sec (Calculated according to FIG. 11)
 Tolerance adjustment: 0.0 Meter/sec (Calculated according to FIG. 11).
 Effective deviation tolerance: 2.0 Meter/sec (Calculated according to FIG. 11)

In these normal operating conditions, the wind turbine produces power according to theoretical estimates, within acceptable margins of error.

Evolution after 4 Hours of Operation
 The meteorological conditions are now:
 Ambient temperature: −0.6° C.
 Relative humidity: 98.68%
 Solar influx: 0 Watts/m$^2$
 Result: Estimated icing risk=65.04% (Calculated according to FIGS. 14A-14D)
 Operational conditions for wind turbine are now:
 Wind speed: 8.65 Meter/sec
 Blade position: 2°
 Produced power: 627 KWatts
 Theoretical wind speed at 627 KWatts: 7.93 Meter/sec
 Wind turbine efficiency deviation: −0.702 Meter/sec (Calculated according to FIGS. 13A-13D)
 Deviation average for network of wind turbine as a whole: −0.68 Meter/sec
 Deviation average used: −0.70 Meter/sec (Calculated according to FIG. 15)
 Basic deviation tolerance: 2.0 Meter/sec (Calculated according to FIG. 16)
 Tolerance adjustment: 0.0 Meter/sec (Calculated according to FIG. 16).
 Effective deviation tolerance: 2.0 Meter/sec (Calculated according to FIG. 16)

After 4 hours of operation, the meteorological measurements indicate an increase in relative humidity and a decrease in temperature. The conditions favourable for icing of the blades are met rapidly. The system evaluates the risks of icing to be 83%. The system therefore lowered the efficiency deviation tolerance to 0.85 m/sec in order to adjust start and stop of the wind turbine. It is possible that there is already a light accumulation of ice on the blades since there is a perceived efficiency deviation of −0.72 m/sec. At this stage, the accumulation of ice is imperceptible by eye, at the foot of the wind turbine.

Evolution after 6 Hours of Operation
 The meteorological conditions are now:
 Ambient temperature: −2.8° C.
 Relative humidity: 99.1%
 Solar influx: 0 Watts/m$^2$
 Result: Estimated icing risk=100.0% (Calculated according to FIGS. 19A-19D)
 Operational conditions for wind turbine are now:
 Wind speed: 8.35 Meter/sec
 Blade position: 2°
 Produced power: 430 KWatts
 Theoretical wind speed at 430 KWatts: 7.14 Meter/sec
 Wind turbine efficiency deviation: −1.20 Meter/sec (Calculated According to FIGS. 18a-18d)
 Deviation average for network of wind turbine as a whole: −0.79 Meter/sec
 Deviation average used: −0.995 Meter/sec (Calculated according to FIG. 20)
 Basic deviation tolerance: 2.0 Meter/sec (Calculated according to FIG. 21)
 Tolerance adjustment: 1.0 Meter/sec (Calculated according to FIG. 21).
 Effective deviation tolerance: 1.0 Meter/sec (Calculated according to FIG. 21)

After 6 hours of operation, the meteorological measurements indicate a new increase in relative humidity and a constant decrease of ambient temperature. The efficiency deviation becomes important and even exceeds the tolerance. There is definitively an accumulation of ice on the wind turbine blades. At this moment, the system takes the decision to stop the wind turbine in order to avoid a overly large accumulation and therefore cancel any risk of injury or damages due to pieces of ice detaching themselves and also with the goal of reducing the blade de-icing period when meteorological conditions will allow it.

It will be also possible to command a stop of the wind turbine when the icing probability parameter reaches 98%, no matter what the production deviation tolerance is in order to avoid any formation of ice on the wind turbine blades.

Other Considerations with Respect to the Operation of the System

The system according to a preferred embodiment of the invention allows the detection and prevention of the formation of ice on blades of a wind turbine or a network of wind turbines and allows to minimize production losses associated with blade icing. The invention allows detection of periods that are favourable to the formation of ice on the blade by measuring climatic conditions on site and, more particularly, ambient temperature, relative humidity, wind speed and solar influx.

Preferably, the system according to a preferred embodiment of the invention proceeds with data acquisition using an industrial automate connected to a meteorological station and a complete network of wind turbines through a communication network.

Preferably, the system evaluates the loss in performance of each of the wind turbines and combines the site conditions to those of the wind turbine preferably with fuzzy logic equations, in order to obtain an appreciation of the criticality of stopping the machine.

Preferably, the system permanently evaluates the parameters as a whole that are transmitted to it in order to quantify the risks of icing.

Preferably, it also becomes possible to measure the risks incurred at the start of operation and/or when the wind turbine is left operating by combining through logic the icing risk parameter to a wind turbine efficiency deviation parameter.

Preferably, in its most simple application, the criticality level can be used to send a stop signal starting at a certain limit or can be sent to a matrix comprising environmental, geographical and spatial parameters linked to the wind turbine. In all cases, a preventive stopping operation of the wind turbine allows a limitation in the quantity of ice accumulated on the wind turbine blades during icing periods. It also allows a limitation of risks linked to projections of ice from the blades. Stopping the wind turbine, before reaching icing limits, further allows an instantaneous restart when the icing period is finished.

The system according to a preferred embodiment of the invention therefore allows a more rapid stopping operation of the wind turbines thus limiting the quantity of ice accumulated on the blades and a rapid restart, without waiting for a period of temperature above two degree Celcius, allowing the ice accumulated during operation in these icing conditions to melt.

The system according to the preferred embodiment of the invention detects, through the measurement of a few key parameters, conditions favourable to icing, in other words an icing cloud. When an icing cloud is detected, the machines are preferably stopped as soon as the first symptoms of icing appear. In extreme cases, the stopping operation can be made without waiting for symptoms of loss of production.

Preferably, the conditions related to wind turbine icing are intimately linked to relative humidity and temperature. When, for example, the humidity is lower than 85%, the risks of icing are very low. The risks increase significantly when the relative humidity exceeds 85%. When humidity exceeds 95%, an icing cloud is almost guaranteed. In all the previously cited cases, the temperature of the air must be lower than two degree Celsius.

However, experience shows that icing is less probable at very low temperatures. Moreover, the rate of solar influx allows one to distinguish certain false events, occurring primarily during day time, since significant solar influx in midday decreases the risks of icing clouds.

List of Typical Equipment

The material elements used preferably comprise an IEC-1131-3 compatible industrial automate. In the case of a prototype according to a preferred embodiment, a Momentum Modicon automate with the different following interfaces has been used:

processor: Modicon Momentum 171-CCC-960-30 IEC;
input card: Modicon Momentum 170-ADM-390-30 (10E/8S Relay);
communication card: Modicon Momentum 172-JNN-210-32;
programming software: Modicon Concept V2.5;
combined temperature and humidity sensors:
  Vaisala HMT330-7T0B004BCAE100A01CABAA1;
solar influx detector: Kipp & Zonen CMP3+Ventilation CV2;
material and/or software interfaces for transmitting operational data from the wind turbines towards the Momentum automate.

Description of Principal Functional Blocks Used

The details of the principal blocks used and their transfer functions can be found in the programming software documentation of Concept 2.5 of Schneider Electric—Modicon where it is explained how the FUZ_PROD_*** blocks produce a fuzzy product, the FUZ_ATERM_INT and FUZ_A-TERM_REAL blocks accomplish fuzzification of all the terms and the LAG1 blocks accomplish time delays. Certain details on these blocks are provided below as a reference.

ADD, SUB, MUL, DIV blocks

These blocks accomplish basic mathematical functions.

LOOKUP_TABLE block

Functional Description:

This functional block attempts to make linear the characteristic curves through interpolation. This functional block operates with the distance between variable support points. The number of inputs XiYi can be increased through a modification of the vertical height of the block frame to 30. This corresponds to 15 pairs of support points. The number of inputs must be an even number. The X values must be in ascending order. As additional parameters, it is possible to plan EN and ENO.

Parameter Description:

| Parameters | Type of data | Description |
| --- | --- | --- |
| XiYi1 | REAL | X coordinates of first support point |
| XiYi2 | REAL | Y coordinates of first support point |
| XiYin | REAL | X coordinates with support point |
| XiYim | REAL | Y coordinates with support point |
| X | REAL | Input size |
| Y | REAL | Output size |
| QXHI | BOOL | Display: X > Xm |
| QXLO | BOOL | Display: X < X1 |

Two inputs following each other respectively (XiYi) represent a pair of support points. The first input XiY1 corresponds to X1, the next, Y1, the following X2, etc. For the chosen input value for X and being located between the support points, the corresponding Y output value is interpolated by considering a linear polygonal line between the support points. For X<X1 Y=Y1 For X>Xm Y=Ym. When the X input value exceeds the value of the last support point Xm, the output QXHI becomes "1". When the X input value does not reach the value of the last support point X1, the output QXHO becomes "1".

Figure 22:
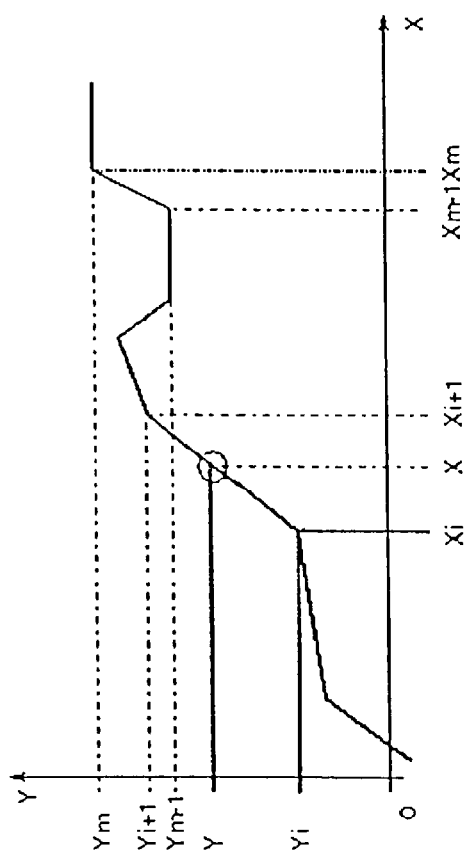
FIG. 22 is a graph showing a polygonal trace with first order interpolation.

Interpolation Principle:

FIG. 22 shows a graph illustrating the first order polygonal interpolation.

For a Y point, we have the following algorithm: for Xi£X£Xi+1 and i=1 . . . (m−1) Condition: X1£X2£ . . . £Xi£Xi+1£ . . . £Xm−1£Xm. The X values must be in ascending order. Two adjacent X values can have the same value. It is therefore possible to have a discontinuous curve. One then has the particular case of: Y=0.5×(Yi+Yi+1) for Xi=X=Xi+1 and i=1 . . . (m−1).

LAG1 Block

Description of the Function:

This functional block represents a first order lag parameter. This functional block has the following functional modes: Manual, Pause and Automatic. The additional parameters EN and ENO can be reconfigured.

The transfer function is the following:

$$G(s) = \text{gain} \times \frac{1}{1 + s \times lag}$$

The calculation formula is the following:

$$Y = Y_{(old)} + \frac{dt}{LAG + dt} \times \left(gain \times \frac{X_{(old)} + X_{(new)}}{2} - Y_{(old)}\right)$$

Description of Sizes

| Size | Description |
| --- | --- |
| $X_{(old)}$ | Value of X input of preceding cycle |
| $Y_{(old)}$ | Value of Y output of preceding cycle |
| dt | Time between actual cycle and preceding cycle |

Description of Module Parameters:

| Parameters | Data type | Description |
| --- | --- | --- |
| MAN | BOOL | "1" = Manual mode |
| HALT | BOOL | "1" = Pause mode |
| X | REAL | Input value |
| GAIN | REAL | Gain |
| LAG | TIME | Lag constant |
| YMAN | REAL | Manual value |
| Y | REAL | Output |

Parameterization

One can define parameters for the functional block by determining the GAIN as well as the LAG constant. The Y output follows with a lag the input signal X (jump from 0 to 1.0 at input X). It approaches the value according to an exponential function.

Functional Modes:

Three functional modes can be selected with the inputs MAN and HALT:

| Functional mode | MAN | HALT | Description |
| --- | --- | --- | --- |
| Automatic | 0 | 0 | The functional block is treated in the manner described in the parameterization section. |
| Manual | 1 | 0 or 1 | The manual value YMAN is transmitted directly to the output Y. |
| Pause | 0 | 1 | The Y output keeps its last calculated value. The output is not modified but can be overwritten by the user. |

Example

Figure 23:
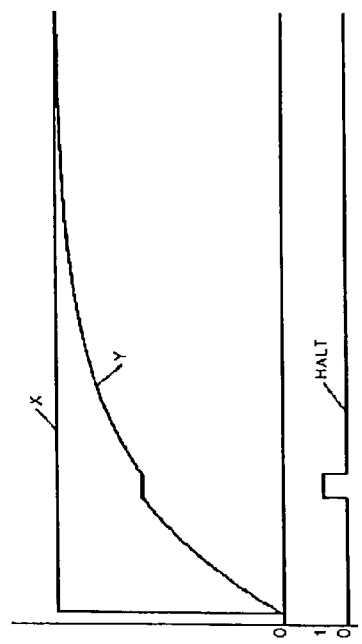
FIG. 23 is a graph illustrating a sample response to a step in the functional block LAG.

The diagram on FIG. 23 shows an example of a response to the LAG element step: the X in put jumps to a new value and the Y output follows the input X according to an exponential function. The response to the Functional Block LAG1 step when GAIN=1.

LAG_FILTER block

Functional Description:

This functional block represents a first order lag parameter. This functional block has the following functional modes:
Tracking
Automatic The additional EN and ENO parameters can be reconfigured.

Formula:

The transfer function is the following:

$$G(s) = GAIN \times \frac{1}{1 + s \times LAG}$$

The calculation formula is the following:

$$OUT = OUT_{(old)} + \frac{dt}{LAG + dt} \times \left(GAIN \times \frac{IN_{(old)} + IN_{(new)}}{2} - OUT_{(old)}\right)$$

Description of Sizes:

| Sizes | Description |
| --- | --- |
| $IN_{(old)}$ | IN input value of preceding cycle |
| $OUT_{(old)}$ | OUT output value of preceding cycle |
| dt | Time between actual cycle and preceding cycle |

Description of Module Parameters

| Parameters | Data type | Description |
| --- | --- | --- |
| IN | REAL | Input value |
| GAIN | REAL | Gain |
| LAG | TIME | Lag constant |
| TR_I | REAL | Initialization input |
| TR_S | BOOL | Initialization "1" type = Tracking "0" Mode = Automatic mode |
| OUT | REAL | Output |

Parameterization:

The block function can be parameterized by determining the GAIN gain as well as the lag constant LAG. The OUT output follows with a lag the IN input signal step (jump from 0 to 1.0 at input IN). It approaches the value exp(-t/LAG) GAIN×X according to an exponential function.

Functional Modes:

Two functional modes can be selected for the input TR_S:

| Functional mode | TR_S | Description |
| --- | --- | --- |
| Automatic | 0 | The functional block is treated in the same manner described in the Parameterization section. |
| Tracking | 1 | The Tracking value TR_I is transmitted directly to the OUT output. |

Example

Figure 24:
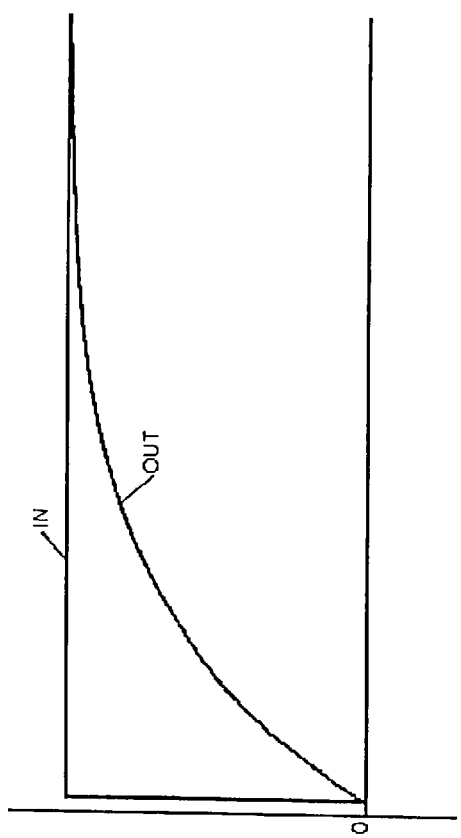
FIG. 24 is a graph illustrating an example of an indicial response of the functional block LAG_FILTER.

The diagram on FIG. 24 given an example of the indexing response of the functional block LAG_FILTER: the IN input jumps to a new value and the OUT output follows the IN input according to an exponential function. The index response of the function block LAG_FILTER at GAIN=1

LIMIT_REAL block

Description of the Function:

The function transmits, at the output, the unchanged input value (IN), if the value is not lower than a minimum value (MN), nor greater than a maximum value (MX). If the input value (IN) is lower than the minimum value (MN), this value is transmitted to the output. If the input value (IN) is greater than the maximum value (MX), this value is transmitted to the output. The processing is related to data types from the group ANY_ELEM. The data types of all the input values and that of the output value must be identical. For processing of different types of data, one has respectively a particular function. EN and ENO can be managed as additional parameters.

Formula:

OUT=IN, if (IN³MN)&(IN£MX)OUT=MN, if (IN<MN)OUT=MX, if (IN>MX)

Description of Block Parameters:

| Parameters | Data types | Description |
|---|---|---|
| MN | INT, DINT, UINT, UDINT, REAL, TIME, BOOL, BYTE, WORD | Lower limit value |
| IN | NT, DINT, UINT, UDINT, REAL, TIME, BOOL, BYTE, WORD | Input |
| MX | INT, DINT, UINT, UDINT, REAL, TIME, BOOL, BYTE, WORD | Upper limit value |
| OUT | INT, DINT, UINT, UDINT, REAL, TIME, BOOL, BYTE, WORD | Output |

SEL Block

Description of Function:

The function is used to make a binary choice between two input values. Depending on the state of the input G, the input transmitted to the output OUT is either IN0, or IN1.G=0->OUT=IN0G=1->OUT=IN1. The data types of the input values IN0 and IN1 and of the output value OUT must be identical. EN and ENO can be managed as additional parameters.

Description of Block Parameters:

| Parameters | Data types | Description |
|---|---|---|
| G | BOOL | Selection input |
| IN0 | ANY | Input 0 |
| IN1 | ANY | Input 1 |
| OUT | ANY | Output |

FUZ_ATERM_REAL block

Description of Function:

The functional block fuzzifies up to 9 terms of linguistic variables (input X) and indicates each membership degree (output MD1 . . . MD9). The range of values at the output for the INT data type ranges between 0 . . . 10 000 and for the REAL data type 0 . . . 1. The membership functions are defined by support points (extendible inputs S1 . . . S9).

The functional block works with a simplification tailored to the definition of the membership functions:

ramps for the first and last membership functions
triangles for membership functions between the first and the last
the sum of two membership degrees of two successive linguistic terms is always 1 (10 000)
the sum of membership degrees of all the linguistic terms for each input value X is always 1 (10 000)

The number of support points (S1 . . . Sx) can be increased to 9 max. through an increase in the vertical framing of the block. It is not possible to configure more support points.

The number of membership degrees calculated corresponds to the number of membership functions. If the configuration comprises less than nine membership functions, the remaining outputs have a value of 0 (e.g. 4 for membership functions, one can count 4 membership degrees for MD1 . . . MD4 and MD5 . . . MD9 go to 0). The data types for all of the input values and the output values must be identical. A particular functional block is available each time for the elaboration of different data types.

One can configure EN and ENO as additional parameters.

Description of Block Parameters:

| Parameters | Data types | Description |
|---|---|---|
| X | INT, REAL | Linguistic variable |
| S1 | INT, REAL | S1 support point |
| S2 | INT, REAL | S2 support point |
| . | . | . |
| . | . | . |
| . | . | . |
| S9 | INT, REAL | S9 support point |
| MD1 | INT, REAL | Output membership degree MD1 |
| MD2 | INT, REAL | Output membership degree MD2 |
| . | . | . |
| . | . | . |
| . | . | . |
| MD9 | INT, REAL | Output membership degree MD9 |

Description of Parameters:

With the functional block FUZ_ATERM, all the terms of a linguistic variable can be fuzzified at the same time. The membership functions are determined through support points (S1, S2, S3, . . . ). The concept of this fuzzification allows a definition of the extremities of several membership functions with one support point at a time. The membership functions present themselves as ramps and triangles, the sum of the different membership degrees being always 100%. These correlations are presented in the following temporal diagrams:

Cycle Diagrams:

FIGS. 25A and 25B are graphs illustrating cycle diagrams for the functional block FUZ_ATERM_REAL with 2 membership functions (2 support points, 2 membership degrees) and 4 membership functions (4 support points, 4 membership degrees) respectively.

FUZ_PROD REAL block

Description of the Function:

The function produces the product (output MD) of the membership degrees (extendible inputs MD1 . . . MDx). Moreover, the function carries out (for the calculation of integers) a multiplication by taking into account the range of value of the membership degree (0 . . . 10 000). The ranges of values at the inputs and at the output comprise for the data types INT 0 . . . 10 000 and for the data types REAL 0 . . . 1. The number of inputs can be increased. One can configure EN and ENO as additional parameters.

Description of Block Parameters:

| Parameter | Data types | Description |
|---|---|---|
| MD1 | INT, REAL | 1. membership degree |
| MD2 | INT, REAL | 2. membership degree |
| . | . | . |
| . | . | . |
| . | . | . |
| MDx | INT, REAL | x. membership degree |
| MD | INT, REAL | Output product (fuzzy) |

Description of the Function:

In the REAL arithmetic, one reaches the result of the product of the membership degree through simple multiplication.

| Rule | Example |
|---|---|
| (0 ... 1)*(0 ... 1) = (0 ... 1) | 0.3*0.6 = 0.18 |

In whole number arithmetic, a calculation must be carried out conditioned by a scaling of the range of values:

| Rule | Example |
|---|---|
| (0 ... 10000)*(0 ... 10000) = (0 ... 10000) | 3000*6000 = 1800(!) |

Several modifications can be carried out with respect to the preferred embodiment that has been described without being beyond the scope of the present invention. It is understood that the components and configurations are not all essential to the invention and should not be used in a restrictive sense in order to limit the scope of the present invention. The system must be able to adapt itself to configurations proposed by different wind turbine manufacturers in order to maintain all of its functionalities. The list of components can therefore not be considered to be exhaustive or limitative.

Moreover, in the context of the present description, the expression "turbine" and "wind turbine" as well as any other equivalent expression can be used in an interchangeable manner, as it would be apparent to a person of skill in the art.

Moreover, other components, other types of relationships between the components as well as other material configurations can be used in order to implement the system to control a wind turbine.

The invention claimed is:

1. A system for controlling a wind turbine, comprising:
    meteorological instruments for measuring ambient climate conditions, including an average ambient temperature, an average ambient relative humidity and an average ambient solar influx, and generating meteorological signals related thereto;
    a memory for keeping in memory an icing tolerance;
    a first calculator for calculating an overall icing probability adjusted as a function of the average ambient solar influx, the average ambient temperature, and the average ambient relative humidity; and
    a controller for stopping the wind turbine when the overall icing probability is greater than the icing tolerance.

2. The system according to claim 1, wherein the memory stores reference efficiency curves and an efficiency deviation tolerance, and the system further comprises:
    sensors for detecting an average power generated by the wind turbine, an average position of the wind turbine blades, and an average wind speed proximate the wind turbine, and for generating efficiency signals based thereon; and
    a second calculator for calculating the actual efficiency of the wind turbine based on the efficiency signals, the controller stopping the wind turbine when a deviation between the actual efficiency and an average efficiency calculated based upon the reference efficiency curves is greater than an efficiency deviation tolerance.

3. The system according to claim 1, wherein the first calculator comprises:
    first means for calculating a first relative humidity variable associated with the average ambient temperature, said first variable being obtained through interpolation of a first characteristic curve of characteristic variables of relative humidity as a function of a characteristic ambient temperature;
    second means for calculating a second relative humidity variable resulting from the subtraction of a lower limit value from the first variable;
    third means for calculating a first partial probability of icing corresponding to a first degree of approach between 0.0 and 1.0 of the ambient average humidity towards the first variable according to a fuzzification operation to obtain membership degrees of the ambient average humidity to the first variable and second variable;
    fourth means for calculating a second degree of approach and a third degree of approach between 0.0 and 1.0 of the average ambient temperature towards a lower limit temperature and an upper limit temperature respectively according to a fuzzification operation to obtain membership degrees of the ambient average temperature to a series of temperatures comprising the lower limit temperature, the upper limit temperature, at least one additional temperature lower than the lower limit temperature and at least one additional temperature above the upper limit temperature;
    fifth means for calculating a second partial probability of icing by adding the second degree of approach and the third degree of approach;
    sixth means for calculating a third partial probability of icing by multiplying the first partial probability of icing and the second partial probability of icing;
    seventh means for calculating a fourth degree of approach and a fifth degree of approach between 0.0 and 1.0 of the average ambient solar influx towards a lower limit solar influx and an upper limit solar influx respectively according to a fuzzification operation to obtain membership degrees of the average ambient solar influx to a series of values of solar influx comprising the lower limit solar influx and the upper limit solar influx and at least two other values of solar influx between the lower limit solar influx and the upper limit solar influx;
    eighth means for calculating a upward adjustment parameter based on solar influx according to the formula:

upward adjustment parameter=((fourth degree of approach)×0.1)+1.0;

ninth means for calculating a downward adjustment parameter based on solar influx according to the formula:

downward adjustment parameter=1.0−((fifth degree of approach)×0.1);

tenth means for calculating an amplified probability of icing by multiplying the third partial probability of icing by the upward adjustment parameter and the downward adjustment parameter; and
    eleventh means for calculating the overall icing probability of icing which is equal to the amplified probability of icing if the amplified probability of icing is equal or lower than 1.0 and the overall icing probability is equal to 1.0 if the amplified probability of icing is greater than 1.0.

4. The system according to claim 3, wherein the second calculator comprises:
- twelfth means for calculating a first theoretical wind speed associated with the average power generated by the wind turbine, said first theoretical wind speed being obtained through interpolation of a second generated power characteristic curve as a function of wind speed at a lowest temperature measured proximate the wind turbine;
- thirteenth means for calculating a second theoretical wind speed associated with the average power generated by the wind turbine, said second theoretical wind speed being obtained through interpolation of a third generated power characteristic curve as a function of wind speed at a highest temperature measured proximate the wind turbine;
- fourteenth means for calculating a sixth degree of approach and a seventh degree of approach between 0.0 and 1.0 of the average ambient temperature towards a first critical temperature and a second critical temperature respectively according to a fuzzification operation to obtain membership degrees of the ambient average temperature to a first critical temperature and a second critical temperature;
- fifteenth means for calculating a first intermediate theoretical wind speed by multiplying the sixth degree of approach by the first theoretical wind speed, a second intermediate theoretical wind speed by multiplying the seventh degree of approach by the second theoretical wind speed, and a third intermediate theoretical wind speed by adding the first intermediate theoretical wind speed and the second intermediate theoretical wind speed;
- sixteenth means for calculating a third theoretical wind speed associated with an average position of the wind turbine blades, said third theoretical wind speed being obtained through interpolation of a third characteristic curve of the position of the blades as a function of the wind speed at the lowest temperature measured proximate the wind turbine;
- seventeenth means for calculating a fourth theoretical wind speed associated with the average position of the wind turbine blades, said fourth theoretical wind speed being obtained through interpolation of a fourth characteristic curve of the position of the blades as a function of the wind speed at the highest temperature measured proximate the wind turbine;
- eighteenth means for calculating an eighth degree of approach and a ninth degree of approach between 0.0 and 1.0 of the average ambient temperature towards a third critical temperature and a fourth critical temperature respectively according to a fuzzification operation to obtain membership degrees of the average ambient temperature towards the third critical temperature and the fourth critical temperature;
- nineteenth means for calculating a fourth intermediate theoretical wind speed by multiplying the eighth degree of approach by the third theoretical wind speed, a fifth intermediate theoretical wind speed by multiplying the ninth degree of approach by the fourth theoretical wind speed, and a sixth intermediate theoretical wind speed by adding the fourth intermediate theoretical wind speed and the fifth intermediate theoretical wind speed;
- twentieth means for calculating a tenth degree of approach and an eleventh degree of approach between 0.0 and 1.0 of the average wind speed proximate the wind turbine towards a first critical wind speed and a second critical wind speed respectively according to a fuzzification operation in order to obtain membership degrees of the average wind speed towards a first critical wind speed and a second critical wind speed;
- twenty-first means for calculating a seventh intermediate theoretical wind speed by multiplying the tenth degree of approach by a third intermediate theoretical wind speed, an eighth intermediate theoretical wind speed by multiplying the eleventh degree of approach by the sixth intermediate theoretical wind speed, and a ninth intermediate theoretical wind speed by adding the seventh intermediate theoretical wind speed and the eighth intermediate theoretical wind speed; and
- twenty-second means for calculating the deviation between the actual efficiency and the average efficiency by subtracting the average wind speed proximate the wind turbine from the ninth intermediate wind speed.

5. A method for controlling a wind turbine, comprising the steps of:
   a) measuring ambient climate conditions, including an average ambient temperature, an average ambient relative humidity and an average ambient solar influx, and generating meteorological signals related thereto;
   b) storing in a memory an icing tolerance;
   c) calculating an overall icing probability adjusted as a function of the average ambient solar influx, the average ambient temperature, and the average ambient relative humidity; and
   d) stopping the wind turbine when the overall icing probability is greater than the icing tolerance.

6. The method of controlling the wind turbine according to claim 5, further comprising the steps of:
   e) storing in the memory reference efficiency curves and an efficiency deviation tolerance;
   f) detecting an average power generated by the wind turbine, an average position of the wind turbine blades, and an average wind speed proximate the wind turbine, and generating efficiency signals based thereon;
   g) calculating an actual efficiency of the wind turbine based on the efficiency signals; and
   h) stopping the wind turbine when a deviation between the actual efficiency and an average efficiency calculated based on the reference efficiency curves is greater than the efficiency deviation tolerance.

7. The method of controlling the wind turbine according to claim 5, wherein step c) comprises the sub-steps of:
   i) calculating a first relative humidity setting associated with the average ambient temperature, said first setting being obtained through interpolation of a first characteristic curve of the relative humidity characteristic settings as a function of a characteristic ambient temperature;
   ii) calculating a second relative humidity setting resulting from a subtraction of a lower limit value from the first setting;
   iii) calculating a first partial probability of icing corresponding to a first degree of approach between 0.0 and 1.0 of the ambient average humidity towards a first setting according to a fuzzification operation in order to obtain membership degrees of the ambient average humidity towards the first setting and the second setting;
   iv) calculating a second degree of approach and a third degree of approach between 0.0 and 1.0 of the average ambient temperature towards a lower limit temperature and an upper limit temperature respectively according to a fuzzification operation in order to obtain membership degrees of the ambient average temperature to a series of temperatures comprising the lower limit temperature, the upper limit temperature, at least one additional temperature lower than the lower limit temperature and at least one additional temperature greater than the upper limit temperature;

v) calculating a second partial probability of icing by adding the second degree of approach and the third degree of approach;

vi) calculating a third partial probability of icing by multiplying the first partial probability of icing and the second partial probability of icing;

vii) calculating a fourth degree of approach and a fifth degree of approach between 0.0 and 1.0 of the average ambient solar influx towards a lower limit solar influx and an upper limit solar influx respectively according to a fuzzification operation to obtain membership degrees of the average ambient solar influx to a series of values of solar influx comprising the lower limit solar influx and the upper limit solar influx and at least two other values of solar influx between the lower limit solar influx and the upper limit solar influx;

viii) calculating a solar influx upward adjustment parameter according to the formula:

upward adjustment parameter=((fourth degree of approach)×0.1)+1.0;

ix) calculating a solar influx downward adjustment parameter according to the formula:

downward adjustment parameter=1.0−((fifth degree of approach)×0.1);

x) calculating an amplified probability of icing by multiplying the third partial probability of icing by the upward adjustment parameter and the downward adjustment parameter; and xi) calculating the probability of icing which is equal to the amplified probability of icing if the amplified probability of icing is equal or lower than 1.0 and the probability of icing is equal to 1.0 if the amplified probability of icing is greater than 1.0.

8. The method of controlling the wind turbine according to claim 7, wherein step g) comprises the sub-steps of:

xii) calculating a first theoretical wind speed associated with the average power generated by the wind turbine, said first theoretical wind speed being obtained through interpolation of a second characteristic curve of power generated as a function of wind speed at a lowest temperature measured proximate the wind turbine;

xiii) calculating a second theoretical wind speed associated with the average power generated by the wind turbine, said second theoretical wind speed being obtained through interpolation of a third characteristic curve of power generated as a function of wind speed at a highest temperature measured proximate the wind turbine;

xiv) calculating a sixth degree of approach and a seventh degree of approach between 0.0 and 1.0 of the average ambient temperature towards a first critical temperature and a second critical temperature respectively according to a fuzzification operation to obtain membership degrees of the average ambient temperature towards the first critical temperature and the second critical temperature;

xv) calculating a first intermediate theoretical wind speed by multiplying the sixth degree of approach by the first theoretical wind speed, a second intermediate theoretical wind speed by multiplying the seventh degree of approach by the second theoretical wind speed and a third intermediate theoretical wind speed by adding the first intermediate theoretical wind speed and the second intermediate theoretical wind speed;

xvi) calculating a third theoretical wind speed associated with the average position of the wind turbine blades, said third theoretical wind speed being obtained through interpolation of a third characteristic curve of the position of the blades as a function of the wind speed at the lowest temperature measured proximate the wind turbine;

xvii) calculating a fourth theoretical wind speed associated with the average position of the wind turbine blades, said fourth theoretical wind speed being obtained through interpolation of a fourth characteristic curve of the position of the blades as a function of the wind speed at the highest temperature measured proximate the wind turbine;

xviii) calculating an eighth degree of approach and a ninth degree of approach between 0.0 and 1.0 of the average ambient temperature towards a third critical temperature and a fourth critical temperature respectively according to a fuzzification operation for obtaining membership degrees of the average ambient temperature towards the third critical temperature and the fourth critical temperature;

xix) calculating a fourth intermediate theoretical wind speed by multiplying the eighth degree of approach by a third theoretical wind speed, a fifth intermediate theoretical wind speed by multiplying the ninth degree of approach by the fourth theoretical wind speed, and a sixth intermediate theoretical wind speed by adding the fourth intermediate theoretical wind speed and the fifth intermediate theoretical wind speed;

xx) calculating a tenth degree of approach and an eleventh degree of approach between 0.0 and 1.0 of the average wind speed proximate the wind turbine towards a first critical wind speed and a second critical wind speed respectively according to a fuzzification operation to obtain membership degrees of the average wind speed towards the first critical wind speed and the second critical wind speed;

xxi) calculating a seventh intermediate theoretical wind speed by multiplying the tenth degree of approach by the third intermediate theoretical wind speed, an eighth intermediate theoretical wind speed by multiplying the eleventh degree of approach by the sixth intermediate theoretical wind speed, and a ninth intermediate theoretical wind speed by adding the seventh intermediate theoretical wind speed and the eighth intermediate theoretical wind speed; and xxii) calculating the deviation between the actual efficiency and average efficiency by subtracting the average wind speed proximate the wind turbine from the ninth intermediate wind speed.

9. The system according to claim 4, wherein the first calculator comprises a twenty-third means for comparing the overall icing probability with an excess probability, activating a timer if the value of the overall icing probability is equal or greater than the excess probability, resetting the timer if the value of the overall icing probability is less than the excess probability, and the controller stops the wind turbine if the timer remains active for a duration exceeding a critical time period.

10. The system according to claim 2, wherein the second calculator comprises a means for adjusting the deviation between the actual efficiency and the average efficiency for the wind turbine before comparing the deviation to the deviation tolerance, by adding to the deviation a deviation average between the actual efficiency and the average efficiency for a series of other wind turbines adjacent to said wind turbine comprising the control system and by dividing the result of the addition by two.

11. The system according to claim 1, wherein the memory stores reference efficiency curves and an efficiency deviation tolerance, the system further comprising:
   sensors for detecting the average power generated by the wind turbine, an average position of the wind turbine blades, and an average wind speed proximate the wind turbine, and generating efficiency signals based thereon;
   a second calculator for calculating an actual efficiency of the wind turbine based on the efficiency signals; and
   a third calculator comprising:
      first means for calculating a sensitivity parameter associated with the overall probability of icing, said sensitivity parameter being obtained through interpolation of a characteristic curve of the sensitivity parameter as a function of the probability of icing; and
      second means for calculating an adjusted efficiency deviation tolerance by subtracting the sensitivity parameter from the efficiency deviation tolerance;
   the controller stopping the wind turbine when a deviation between the actual efficiency and the average efficiency calculated based on the reference efficiency curves is greater than the adjusted efficiency deviation tolerance.

12. The method of controlling the wind turbine according to claim 5, further comprising the steps of comparing the overall icing probability with an excess probability, activating a timer if the value of the overall icing probability is equal or greater than the excess probability, resetting the timer if the value of the overall icing probability is less than the excess probability, and stopping the wind turbine if the timer remains active for a duration exceeding a critical time period.

13. The method of controlling the wind turbine according to claim 6, further comprising the step of adjusting the deviation between the actual efficiency and average efficiency for the wind turbine before comparing the deviation to the deviation tolerance, by adding to the deviation an average of deviations between the actual efficiency and average efficiency for a series of other wind turbines adjacent to the wind turbine comprising the control system and by dividing the result of the addition by two.

14. The method of controlling the wind turbine according to claim 5, further comprising the steps of:
   e) storing in the memory the reference efficiency curves and an efficiency deviation tolerance;
   f) detecting an average power generated by the wind turbine, an average position of the wind turbine blades, and an average wind speed proximate the wind turbine, and generating efficiency signals based thereon;
   g) calculating an actual wind turbine efficiency based on the efficiency signals;
   h) calculating an adjustment parameter associated with the overall icing probability, said adjustment parameter being obtained through interpolation of a characteristic curve of the adjustment parameter as a function of the probability of icing;
   i) calculating a deviation tolerance of the adjusted efficiency by subtracting the adjustment parameter from the efficiency deviation tolerance; and
   j) stopping the wind turbine when a deviation between the actual efficiency and an average efficiency calculated based on reference efficiency curves is greater than the adjusted efficiency deviation tolerance.

\* \* \* \* \*